(12) United States Patent
Gareau

(10) Patent No.: US 11,843,414 B2
(45) Date of Patent: Dec. 12, 2023

(54) FLEXO/ZR SUBRATING AND PARTIAL SURVIVABILITY

(71) Applicant: Ciena Corporation, Hanover, MD (US)

(72) Inventor: Sebastien Gareau, Ottawa (CA)

(73) Assignee: Ciena Corporation, Hanover, MD (US)

(*) Notice: Subject to any disclaimer, the term of this patent is extended or adjusted under 35 U.S.C. 154(b) by 0 days.

(21) Appl. No.: 17/197,573

(22) Filed: Mar. 10, 2021

(65) Prior Publication Data
US 2021/0194576 A1 Jun. 24, 2021

Related U.S. Application Data

(63) Continuation-in-part of application No. 17/087,969, filed on Nov. 3, 2020, now Pat. No. 11,695,472, which is a continuation of application No. 16/405,101, filed on May 7, 2019, now Pat. No. 10,826,600, which is a continuation of application No. 15/290,653, filed on Oct. 11, 2016, now Pat. No. 10,333,614.

(51) Int. Cl.
| | |
|---|---|
| G02F 1/00 | (2006.01) |
| G02F 2/00 | (2006.01) |
| H01S 3/00 | (2006.01) |
| H04B 10/00 | (2013.01) |
| H04J 14/00 | (2006.01) |
| H04B 10/03 | (2013.01) |
| H04J 3/16 | (2006.01) |
| H04J 3/14 | (2006.01) |
| H04B 10/079 | (2013.01) |

(52) U.S. Cl.
CPC ......... *H04B 10/03* (2013.01); *H04B 10/0793* (2013.01); *H04J 3/14* (2013.01); *H04J 3/1652* (2013.01)

(58) Field of Classification Search
CPC ....... H04B 10/03; H04B 10/0793; H04J 3/14; H04J 3/1652
See application file for complete search history.

(56) References Cited

U.S. PATENT DOCUMENTS

| | | | |
|---|---|---|---|
| 7,751,345 | B2 | 7/2010 | Hashiguchi et al. |
| 8,718,471 | B2 | 5/2014 | Prakash et al. |

(Continued)

FOREIGN PATENT DOCUMENTS

| | | | | |
|---|---|---|---|---|
| EP | 3454489 A1 | * | 3/2019 | ............. H04J 14/02 |
| WO | 2019223000 A1 | | 11/2019 | |

OTHER PUBLICATIONS

Maarten Vissers, "Functionality of the three non-OTUCn VCAT routing options", Mar. 2013, Huawei Technologies, all pages (Year: 2013).*

(Continued)

*Primary Examiner* — Pranesh K Barua
(74) *Attorney, Agent, or Firm* — Baratta Law PLLC; Lawrence A. Baratta, Jr.

(57) ABSTRACT

An optical interface includes circuitry configured to operate the optical interface at a first rate, subsequent to a requirement to suberate the optical interface to a second rate, determine which services are affected, signal a partial failure for the one or more affected services, and operate the optical interface at a second rate that is less than the first rate. The optical interface can be a Flexible Optical (FlexO) or ZR interface.

20 Claims, 15 Drawing Sheets

(56) References Cited

U.S. PATENT DOCUMENTS

| | | | |
|---|---|---|---|
| 8,867,913 | B2 | 10/2014 | Gareau et al. |
| 9,088,380 | B2 | 7/2015 | Ibach et al. |
| 9,143,227 | B2 | 9/2015 | Moynihan et al. |
| 9,264,139 | B2 | 2/2016 | Young et al. |
| 9,432,144 | B2 | 8/2016 | Gareau et al. |
| 2002/0099854 | A1* | 7/2002 | Jorgensen ............ H04L 9/40 370/310 |
| 2008/0008085 | A1* | 1/2008 | Gerstel ............ H04L 12/1485 370/216 |
| 2012/0219005 | A1* | 8/2012 | Durve ............ H04L 47/41 370/400 |
| 2014/0363152 | A1 | 12/2014 | Hironaka |
| 2015/0256250 | A1 | 9/2015 | Yan et al. |
| 2016/0056914 | A1 | 2/2016 | Gareau et al. |
| 2016/0119075 | A1 | 4/2016 | Gareau et al. |
| 2016/0119076 | A1 | 4/2016 | Gareau |
| 2016/0234580 | A1 | 8/2016 | Clarke et al. |
| 2018/0006931 | A1 | 1/2018 | Ellis et al. |
| 2018/0102834 | A1* | 4/2018 | Ibach ............ H04B 10/0793 |

OTHER PUBLICATIONS

ITU-T G.709, "Interfaces for the optical transport network", Jun. 2016, ITU-T, p. 30 (Year: 2016).*

N. Sambo et al., "Next generation sliceable bandwidth variable transponders,", Feb. 2015, IEEE Communications Magazine, vol. 53, No. 2, pp. 163-165, (Year: 2015).*

WB Jiang, "Multi-Lane PMD Reliability and Partial Fault Protection (PFP)", Jan. 2008, IEEE 802.3ba Task Force, pp. 14-20 (Year: 2008).*

International Telecommunication Union, ITU-T G.709/Y.1331, Interfaces for the optical transport network, Jun. 2016, pp. 1-256.

International Telecommunication Union, ITU-T G.959.1, Optical transport network physical layer Interfaces, Apr. 2016, pp. 1-76.

Huawei Technologies, "Considerations of FlexO partial fault survivability", Meeting Date Oct. 12-16, 2015, Intended type of document (R-C-TD): WD11-21, pp. 1-7.

Huawei Technologies Co., Ltd. et al., "Behaviour under optical layer faults for non-OTUCn VCAT, (non-)co-routing option; WD36", ITU-T Draft, Study Period 2013-2016, International Telecommunication Union, vol. 11/15, pp. 1-9.

Huawei Technologies Co., Ltd. et al., "Functionality of the three non-OTUCn VCAT routing options [SP4]; WD34", ITU-T Draft, Study Period, 2013-2016, International Telecommunication Union, vol. 11/15, pp. 1-10.

China Telecommunications Corporation China, "Further considerations about beyond 100G OTN requirements; WD43", ITU-T Draft, Study Period, 2013-2016, International Telecommunication Union, vol. 11/15, pp. 1-3.

Dec. 15, 2017 International Search Report for International Application No. PCT/US2017/055028.

Jul. 1, 2022, International Search Report and Written Opinion for International Application No. PCT/US2022/019429.

* cited by examiner

FLEXO/ZR SUBRATING AND PARTIAL SURVIVABILITY

CROSS-REFERENCE TO RELATED APPLICATION(S)

The present disclosure is a continuation-in-part of U.S. patent application Ser. No. 17/087,969, filed Nov. 3, 2020, and entitled "Partial survivability for multi-carrier and multi-module optical interfaces,' which is a continuation of U.S. patent application Ser. No. 16/405,101, filed May 7, 2019, and entitled "Partial survivability for multi-carrier and multi-module optical interfaces," which is now U.S. Pat. No. 10,826,600, issued Nov. 3, 2020, and which is a continuation of U.S. patent application Ser. No. 15/290,653, filed Oct. 11, 2016, and entitled "Partial survivability for multi-carrier and multi-module optical interfaces," which is now U.S. Pat. No. 10,333,614, issued Jun. 25, 2019, the contents of all are incorporated by reference herein in their entirety.

FIELD OF THE DISCLOSURE

The present disclosure generally relates to optical networking systems and methods. More particularly, the present disclosure relates to Flexible Optical (FlexO)/ZR partial survivability as well as partial survivability for multi-carrier and multi-module optical interfaces such as Optical Transport Network (OTN), Flexible Ethernet (FlexE), and FlexO.

BACKGROUND OF THE DISCLOSURE

In high bandwidth optical transport networks, recent standards such as ITU-T Recommendation G.709 "Interfaces for the optical transport network" (06/2016), the contents of which are incorporated by reference, describe the use of multiple optical carriers for a single digital transport interface in line side applications, such as an Optical Transport Unit-Cn (OTUCn) which is carried via multiple Optical Tributary Signal (OTSi) carriers (lambdas). For client side applications, ITU-T Recommendation G.709.1 (under progress) defines the use of multiple client services/modules for a single OTUCn transport service. Similarly, the Optical Internetworking Forum (OIF) has worked on IA # OIF-FLEXE-01.0 "Flex Ethernet Implementation Agreement" (03/2016), the contents of which are incorporated by reference, for FlexE to transport an Ethernet client service across multiple standard rate client interfaces/servers. The standards behavior is that upon a failure of any single carrier/module for the interface; the entire group is considered failed, and consequential actions are taken on the entire interface (or all services carried). As described herein, an interface is used for a network port and a service is used for individual services being carried within the interface. A single group interface can carry one or more services.

Of course, taking down the entire transport interface, although compliant to existing standards, can impact a significant amount of services. As services are deployed across multiple carriers/modules, the overall reliability (Failures in Time (FITS)/Mean Time Between Failures (MTBF)) is at risk. The components involved in the electro-optical interfaces typically have associated high failure rates. As an example, if the entire network interface is 600G and is being carried over four carriers, then a failure of a single carrier affects all 600G even though that single carrier may be responsible for only a quarter of that traffic (150G). Such lack of partial survivability has a major impact on the network in regard to failures. For failures, a network controller requires sufficient bandwidth to restore failed services. The lack of partial survivability significantly increases the amount of bandwidth, e.g., 600G instead of just 150G based on the aforementioned network interface example.

In addition to the use of multiple OTSi for increasing bandwidth, individual interfaces themselves are expanding to support high bit rates, e.g., 400G, 800G, etc. There are situations where a single interface may need to be subrated for partial survivability. Of note, there are approaches defined at the Optical Data Unit level k (ODUk) service layer, but not at the OTUCn/FlexO/ZR interface layer. That is, there are no current definitions for subrating and partial survivability for FlexO/ZR interfaces.

BRIEF SUMMARY OF THE DISCLOSURE

In an embodiment, an optical interface and a method include steps of operating an optical interface at a first rate; subsequent to a requirement to subrate the optical interface to a second rate, determining which one or more services are affected; signaling one or more partial failures for the one or more affected services; an operating the optical interface at a second rate that is less than the first rate. The optical interface can be a Flexible Optical (FlexO) interface. The FlexO interface can include a plurality of Optical Transport Unit C (OTUC) slices each at about 100 Gb/s, and wherein the one or more partial failure are for one or more OTUC slices. The optical interface can be a ZR interface. The optical interface can include a plurality of slices each at about 100 Gb/s, and wherein the one or more partial failure is for one or more slices.

The one or more partial failures can be signaled through one or more of a partial Alarm Indication Signal (P-AIS), a partial Backward Defect Indication (P-BDI), and a partial Server Signal Fail (P-SSF). The steps can further include adjusting overhead of the optical interface based on the one or more partial failure. The steps can further include adjusting one or more of the affected services based on priority. The requirement to subrate can be due to any of optical margin and a requirement to support an alternate path. The optical interface can be part of an Optical Tributary Signal (OTSi).

In another embodiment, a network element includes one or more ports forming a plurality of optical carriers (Optical Tributary Signal (OTSi)) that transport a single Optical Transport Unit Cn (OTUCn) in a network; and circuitry communicatively coupled to the one or more ports and configured to, subsequent to an optical carrier failure of the plurality of optical carriers, determine which services in the OTUCn are affected, cause signaling of a partial failure for the OTUCn and signaling a failure for the affected services, and cause adjustment of some or all of the affected services on non-failed optical carriers of the plurality of optical carriers. The adjustment can include a move of the some or all of the affected services from the optical carrier failure to the non-failed optical carriers based on priority. The OTUCn can have a bandwidth N and the plurality of optical carriers are X optical carriers, X>1, each having a bandwidth $M_1$, $M_2, \ldots, M_X$ each being less than N and a total being equal to N. The circuitry can be further configured to cause overhead adjustment on the OTUCn based on the optical carrier failure such that the overhead is transport on non-failed optical carriers of the plurality of optical carriers The overhead adjustment can include a move of the overhead from the failed optical carrier to one of the non-failed optical carriers. The overhead adjustment can include a defect indication to indicate which of the non-failed optical carriers has the overhead. The overhead adjustment can include identical copies of the overhead on the non-failed optical carriers with a weighted scheme used to determine which copy of the overhead is valid.

In another embodiment, a method include, in a network element with one or more ports forming a plurality of optical carriers (Optical Tributary Signal (OTSi)) that transport a single Optical Transport Unit Cn (OTUCn) in a network, and subsequent to an optical carrier failure of the plurality of optical carriers, determining which services in the OTUCn are affected; signaling a partial failure for the OTUCn and signaling a failure for the affected services; and adjusting some or all of the affected services on non-failed optical carriers of the plurality of optical carriers.

In a further embodiment, a non-transitory computer-readable storage medium having computer readable code stored thereon for programming a network element with one or more ports forming a plurality of optical carriers (Optical Tributary Signal (OTSi)) that transport a single Optical Transport Unit Cn (OTUCn) in a network to, subsequent to an optical carrier failure of the plurality of optical carriers, determine which services in the OTUCn are affected, cause signaling of a partial failure for the OTUCn and signaling a failure for the affected services, and cause adjustment of some or all of the affected services on non-failed optical carriers of the plurality of optical carriers.

In a further embodiment, a partial survivability method implemented in a node in an Optical Transport Unit Cn (OTUCn) network includes, subsequent to an optical carrier (Optical Tributary Signal (OTSi)) failure of a plurality of optical carriers, determining which Optical Data Unit k (ODUk) services in an OTUCn associated with the OTSi are affected; signaling a partial failure for the OTUCn and signaling a failure only for the affected ODUk services; adjusting overhead associated with the OTUCn based on the OTSi failure; and applying actions on the affected ODUk services subsequent to the OTSi failure. The signaling the partial failure can include signaling one or more of a partial Alarm Indication Signal (P-AIS), a partial Backward Defect Indication (P-BDI), and a partial Server Signal Fail (P-SSF) for the OTUCn, and wherein the signaling the failure can include signaling one or more of an Alarm Indication Signal (AIS), a Backward Defect Indication (BDI), and a Server Signal Fail (SSF) only for the affected ODUk services. The adjusting overhead can include adjusting overhead associated with the OTUCn and with an associated Optical Data Unit Cn (ODUCn) and with an associated Optical Payload Channel Cn (OPUCn) between slices.

The adjusting can include using a partial Backward Defect Indication (P-BDI) or a Remote Defect Indication (RDI) to decide by an adjacent transmitter which OTUCn slice overhead is used. The adjusting can include an adjacent transmitter broadcasting the overhead to all OTUCn slices with identical copies with a weighted scheme used by the node to determine which copy of the overhead is valid. The determining can be based on monitoring fault points of the OTSi which failed by the node and determining the affected the ODUk services based on an association maintained by the node of the ODUk services to the failed OTSi. The actions can include one or more of restoring the affected ODUk services, resizing the affected ODUk services, and moving the affected ODUk services, performed through one of a control plane and a Software Defined Networking (SDN) controller. The partial survivability method can further include, responsive to an ODUk service of the affected ODUk services being partially affected by the OTSi failure, adjusting a size of the ODUk service to operate on operational OTSi unaffected by the OTSi failure. The partial survivability method can further include shuffling one or more of the affected ODUk services with unaffected ODUk services based on priority through an edit operation at the node.

In yet another embodiment, a node adapted for partial survivability in an Optical Transport Unit Cn (OTUCn) network includes one or more line modules forming a plurality of optical carriers (Optical Tributary Signal (OTSi)); and a controller adapted to, subsequent to an OTSi failure, determine which Optical Data Unit k (ODUk) services in an OTUCn associated with the OTSi are affected, cause signaling of a partial failure for the OTUCn and signaling a failure only for the affected ODUk services, cause adjustment of overhead associated with the OTUCn based on the OTSi failure, and cause actions on the affected ODUk services subsequent to the OTSi failure. The signaling the partial failure can include signaling one or more of a partial Alarm Indication Signal (P-AIS), a partial Backward Defect Indication (P-BDI), and a partial Server Signal Fail (P-SSF) for the OTUCn, and wherein the signaling the failure can include signaling one or more of an Alarm Indication Signal (AIS), a Backward Defect Indication (BDI), and a Server Signal Fail (SSF) only for the affected ODUk services. The adjustment of overhead can include adjustment of the overhead associated with the OTUCn and with an associated Optical Data Unit Cn (ODUCn) and with an associated Optical Payload Channel Cn (OPUCn) between slices.

The adjustment can include using a partial Backward Defect Indication (P-BDI) or a Remote Defect Indication (RDI) to decide by an adjacent transmitter which OTUCn slice overhead is used. The adjustment can include an adjacent transmitter broadcasting the overhead to all OTUCn slices with identical copies with a weighted scheme used by the node to determine which copy of the overhead is valid. The affected ODUk services can be determined based on monitoring fault points of the OTSi which failed by the node and determining the affected the ODUk services based on an association maintained by the node of the ODUk services to the failed OTSi. The actions can include one or more of restoring the affected ODUk services, resizing the affected ODUk services, and moving the affected ODUk services, performed through one of a control plane and a Software Defined Networking (SDN) controller. The controller can be further adapted to, responsive to an ODUk service of the affected ODUk services being partially affected by the OTSi failure, cause adjustment of a size of the ODUk service to operate on operational OTSi unaffected by the OTSi failure. The controller can be further adapted to cause shuffling one or more of the affected ODUk services with unaffected ODUk services based on priority through an edit operation at the node.

In yet another embodiment, a partial survivability apparatus implemented in a node in an Optical Transport Unit Cn (OTUCn) network includes circuitry adapted to determine, subsequent to an optical carrier (Optical Tributary Signal (OTSi)), failure, which Optical Data Unit k (ODUk) services in an OTUCn associated with the OTSi are affected; circuitry adapted to signal a partial failure for the OTUCn and signal a failure only for the affected ODUk services; circuitry adapted to adjust overhead associated with the OTUCn based on the OTSi failure; and circuitry adapted to apply actions on the affected ODUk services subsequent to the OTSi failure. The signal the partial failure can include signaling one or more of a partial Alarm Indication Signal (P-AIS), a partial Backward Defect Indication (P-BDI), and a partial Server Signal Fail (P-SSF) for the OTUCn, and wherein the signal the failure can include signaling one or more of an Alarm Indication Signal (AIS), a Backward Defect Indication (BDI), and a Server Signal Fail (SSF) only for the affected ODUk services.

BRIEF DESCRIPTION OF THE DRAWINGS

The present disclosure is illustrated and described herein with reference to the various drawings, in which like reference numbers are used to denote like system components/method steps, as appropriate, and in which:

FIG. 5 illustrates how available bandwidth can be identified for network services using a TDM (time domain multiplexing) scheme with associated tributary or calendar slots; FIG. 6 illustrates how channelized services can be allocated to available bandwidth and how that bandwidth can be carried across multiple optical carriers, OTSi; and FIG. 7 illustrates a failure on a single optical carrier, OTSi, and how the bandwidth for the network services is identified and reduced.

FIG. 10 illustrates the OTUCn network without partial survivability, FIG. 11 illustrates the OTUCn network with partial survivability and FIG. 12 illustrates the OTUCn network with partial survivability and with flexible size services.

DETAILED DESCRIPTION OF THE DISCLOSURE

Figure 1:
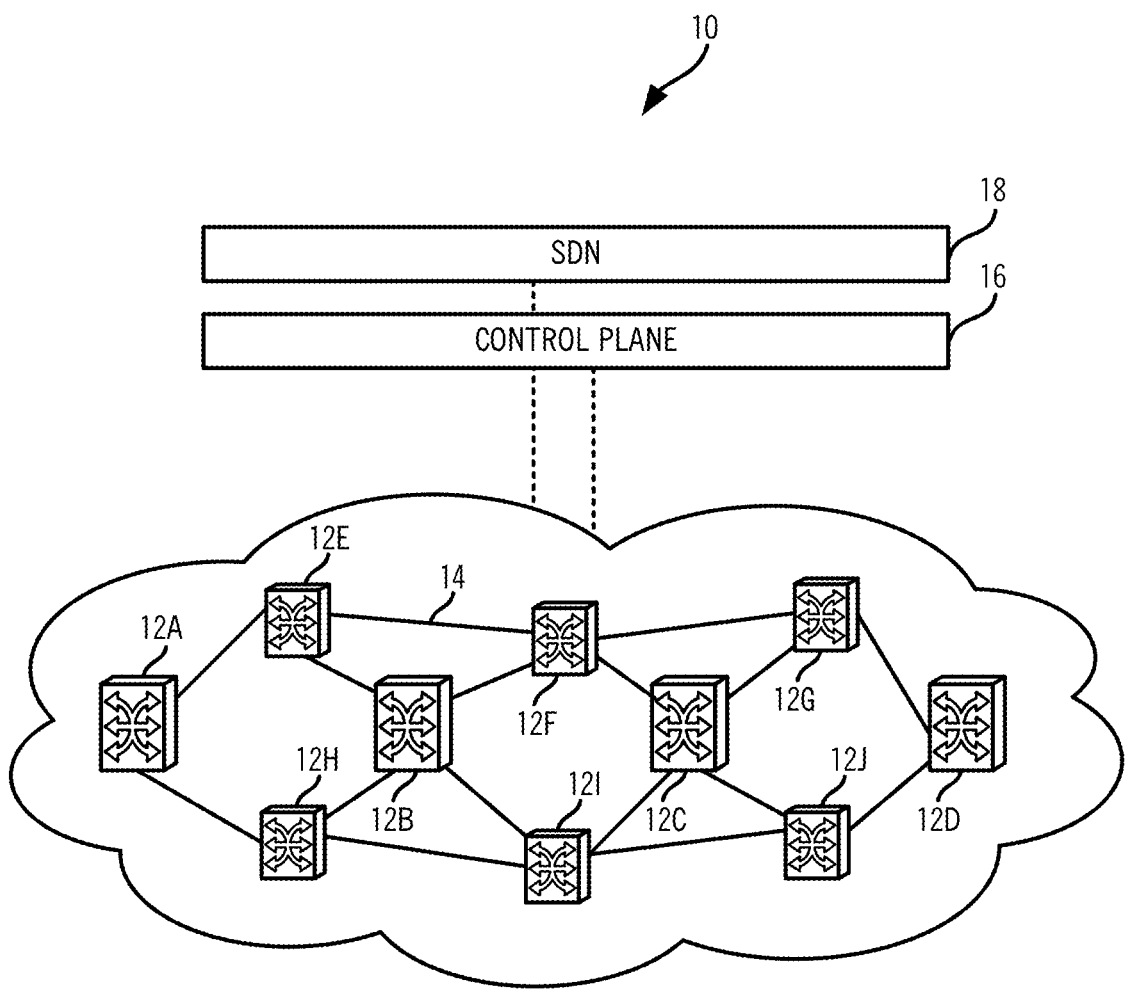
FIG. 1 is a network diagram of an example network with various interconnected nodes.

Again, in various embodiments, the present disclosure relates to Flexible Optical (FlexO)/ZR partial survivability. The objective is to provide subrating at the FlexO/ZR interface layer. In this manner, high-speed interfaces, e.g., 400G, 800G, can be reduced in bandwidth to support applications with different reach/application requirements. The present disclosure includes a partial-Alarm Indication Signal (AIS), partial-Backward Defect Indicator (BDI) and partial-Server Signal Fail (SSF) signal, techniques for handling overhead, and moving of ODUk services and mesh restoration. This approach includes OTN FlexO or OIF ZR and addresses the use case of partial survivability when an interface is subrated. Standards typically define fixed rate FlexO/ZR interfaces, and do not define scenarios where interfaces are subrated dynamically (change of rate). One use case includes optical networks where modems are configured for variable rates based on available margin. This application requires dynamic capacity changes on optical modem coherent interfaces, and this disclosure explores the protocol implications of doing so.

Also, in various embodiments, the present disclosure relates to partial survivability for multi-carrier and multi-module optical interfaces such as Optical Transport Network (OTN), Flexible Ethernet (FlexE), and Flexible Optical (FlexO). As described herein, a failure of any OTSi carriers, the entire OTUCn network interface associated with the OTSi carriers is considered as failed and consequent actions are applied across the entire Optical Data Unit Cn (ODUCn) associated with the OTUCn, affecting all ODUk services within the ODUCn. This also applies similarly to FlexO client interfaces carrying a single High Order (HO) OTUCn and multiple Low Order (LO) Optical Data Unit k (ODUk) services. Note, the term services can be used interchangeably with clients, e.g., ODUk services and FlexE clients. Systems and methods described herein apply consequent actions to only the channelized services which are directly impacted by failed carriers and allow other channelized services to remain intact within the network interface. The consequent actions are not applied across the entire interface (e.g., ODUCn layer for an OTUCn interface) but instead prescriptively applied for each ODUk service (e.g., an ODUk within an OTUCn interface), as required. The signal fail conditions can be selective to events located in a specific OTSi/interface (e.g., degraded defect (dDEG[i]), Loss of Signal (LOS), Loss of Frame (LOF), etc.). A new partial-Alarm Indication Signal (AIS), partial-Backward Defect Indicator (BDI) and partial-Server Signal Fail (SSF) signal is defined as a replacement signal for only the HO OTUC/ODUC slices being affected. The partial-AIS/BDI signal can work along with RS regen nodes.

Partial Survivability for multi-carrier or multi-module interfaces determines specifically which optical carriers are failed for a network service, using specific triggers such as signal degrade, loss of frame delineation (LOF), loss of signal (LOS), etc. which are associated with the specific optical carrier or module. It is able to correlate the available bandwidth assignment information for each of the channelized services within the network service to the failed optical carriers. For those channelized services which occupy bandwidth which is impacted by the failed optical carriers, it will apply consequent actions to signal that traffic is impacted for that channelized service.

Advantageously, the systems and methods provide an ability for an interface to be declared as partially failed with P-AIS, P-SSF and P-BDI statuses and signaling. Further, the systems and methods use various techniques to ensure overhead (OH) survives in the event the first OTUC/ODUC slice is failed (which normally carries various OH). The systems and methods determine which services are up or down on a partially failed interface. Also, the systems and methods can automatically adjust the size of a service based on capacity being automatically adjusted within the interface. Further, the systems and methods can shuffle (substitute) failed and working services based on priority. The systems and methods can disassociate provisioned services (tributary ports in OTN) within an interface from all tributary slots, via an edit instead of having to delete and re-provision the services. The systems and methods can recognize the opportunity to adjust interface capacity to provide greater Signal-to-Noise margin in optical networks, without affecting active services. The systems and methods can exchange partially failed interface information with other networking layers (i.e. Layer 0). Also, the systems and methods allow the server layer (Layer 0) to deprioritize or completely suspend restoration of a partially failed interface's wavelength(s).

The systems and methods provide greater availability and reliability of services within high capacity, multi-channel networks. These partial-survivability systems and methods can complement control-plane and mesh restoration techniques as well as Software Defined Networking (SDN) schemes. As a result, there are reduced network impacts due to fewer services being affected by a partial failure of a group interface. Again, some services can be maintained on partially failed interfaces without declaring an entire ODUCn down. Higher priority services can be maintained on the existing interfaces, reducing the impact of moving the services or declaring them as operationally down. Again, as a result, restoring only those services which are failed requires fewer network resources. If restoring at Layer 1 (TDM), a network only requires enough bandwidth elsewhere to accommodate the failed services, because non-failed services do not need to be restored. Consuming less capacity per interface can result in a wavelength requiring less SNR and therefore could provide additional net system margin back to the network (e.g., downshift from 150G using 8QAM to 100G using QPSK because the additional 50G capacity offered by the 8QAM is not usable by the 100G services). Such additional net system margin can be used by other wavelengths to expand their capacity with flexible, software programmable optical modems. Partially failed interfaces can be reduced in size to eliminated failed bandwidth, additionally freeing up network (Layer 0) bandwidth.

Example Network

Figure 2:
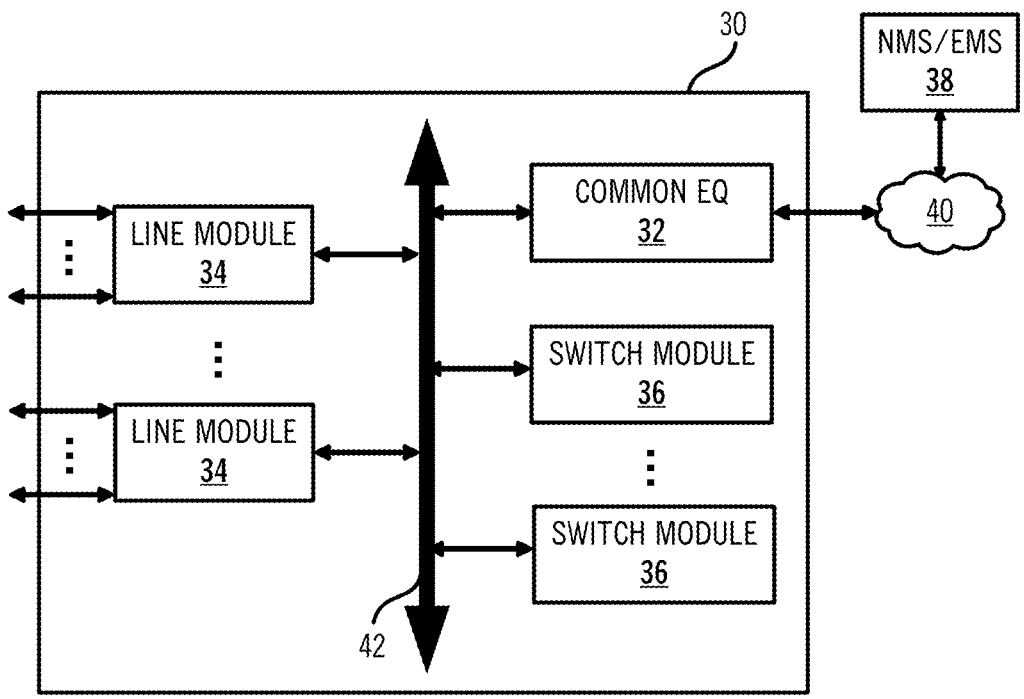
FIG. 2 is a block diagram of an example node for use with the systems and methods described herein.

Referring to FIG. 1, in an embodiment, a network diagram illustrates an network 10 with various interconnected nodes 12 (illustrated as nodes 12A-12J). The nodes 12 are interconnected by a plurality of links 14. The nodes 12 communicate with one another over the links 14 through Layer 0 (L0) such as optical wavelengths (DWDM), Layer 1 (L1) such as OTN, Layer 2 (L2) such as Ethernet, MPLS, etc., and/or Layer 3 (L3) protocols. The nodes 12 can be network elements which include a plurality of ingress and egress ports forming the links 14. An example node implementation is illustrated in FIG. 2. The network 10 can include various services or calls between the nodes 12. Each service or call can be at any of the L0, L1, L2, and/or L3 protocols, such as a wavelength, a Subnetwork Connection (SNC), a Label Switched Path (LSP), etc., and each service or call is an end-to-end path or an end-to-end signaled path and from the view of the client signal contained therein, it is seen as a single network segment. The nodes 12 can also be referred to interchangeably as network elements (NEs). The network 10 is illustrated, for example, as an interconnected mesh network, and those of ordinary skill in the art will recognize the network 10 can include other architectures, with additional nodes 12 or with fewer nodes 12, etc.

The network 10 can include a control plane 16 operating on and/or between the nodes 12. The control plane 16 includes software, processes, algorithms, etc. that control configurable features of the network 10, such as automating discovery of the nodes 12, capacity on the links 14, port availability on the nodes 12, connectivity between ports; dissemination of topology and bandwidth information between the nodes 12; calculation and creation of paths for calls or services; network level protection and restoration; and the like. Example control planes may include Automatically Switched Optical Network (ASON) as defined in ITU-T G.8080/Y.1304, Architecture for the automatically switched optical network (ASON) (02/2012), the contents of which are herein incorporated by reference; Generalized Multi-Protocol Label Switching (GMPLS) Architecture as defined in IETF Request for Comments (RFC): 3945 (10/2004) and the like, the contents of which are herein incorporated by reference; Optical Signaling and Routing Protocol (OSRP) from Ciena Corporation which is an optical signaling and routing protocol similar to Private Network-to-Network Interface (PNNI) and Multi-Protocol Label Switching (MPLS); or any other type control plane for controlling network elements at multiple layers, and establishing connections among nodes. Those of ordinary skill in the art will recognize the network 10 and the control plane 16 can utilize any type of control plane for controlling the nodes 12 and establishing, maintaining, and restoring calls or services between the nodes 12.

An SDN controller 18 can also be communicatively coupled to the network 10 through one or more of the nodes 12. SDN is an emerging framework which includes centralized control decoupled from the data plane. SDN provides the management of network services through abstraction of lower-level functionality. This is done by decoupling the system that makes decisions about where traffic is sent (the control plane) from the underlying systems that forward traffic to the selected destination (the data plane). SDN works with the SDN controller 18 knowing a full network topology through configuration or through the use of a controller-based discovery process in the network 10. The SDN controller 18 differs from a management system in that it controls the forwarding behavior of the nodes 12 only, and performs control in real time or near real time, reacting to changes in services requested, network traffic analysis and network changes such as failure and degradation. Also, the SDN controller 18 provides a standard northbound interface to allow applications to access network resource information and policy-limited control over network behavior or treatment of application traffic. The SDN controller 18 sends commands to each of the nodes 12 to control matching of data flows received and actions to be taken, including any manipulation of packet contents and forwarding to specified egress ports.

Note, the network 10 can use the control plane 16 separately from the SDN controller 18. Conversely, the network 10 can use the SDN controller 18 separately from the control plane 16. Also, the control plane 16 can operate in a hybrid control mode with the SDN controller 18. In this scheme, for example, the SDN controller 18 does not necessarily have a complete view of the network 10. Here, the control plane 16 can be used to manage services in conjunction with the SDN controller 18. The SDN controller 18 can work in conjunction with the control plane 16 in the sense that the SDN controller 18 can make the routing decisions and utilize the control plane 16 for signaling thereof. In the terminology of ASON and OSRP, SNCs are end-to-end signaled paths or calls since from the point of view of a client signal; each is a single network segment. In GMPLS, the connections are an end-to-end path referred to as LSPs. In SDN, such as in OpenFlow, services are called "flows." Those of ordinary skill in the art will recognize that SNCs, LSPs, flows, or any other managed service in the network can be used with the systems and methods described herein for end-to-end paths. Also, as described herein, the term services is used for generally describing OTN connections in the network 10.

Example Network Element/Node

Referring to FIG. 2, in an embodiment, a block diagram illustrates an example node 30 for use with the systems and methods described herein. In an embodiment, the example node 30 can be a network element that may consolidate the functionality of a Multi-Service Provisioning Platform (MSPP), Digital Cross-Connect (DCS), Ethernet and/or Optical Transport Network (OTN) switch, Wave Division Multiplexed (WDM)/Dense WDM (DWDM) platform, Packet Optical Transport System (POTS), etc. into a single, high-capacity intelligent switching system providing Layer 0, 1, 2, and/or 3 consolidation. In another embodiment, the node 30 can be any of an OTN Add/Drop Multiplexer (ADM), a Multi-Service Provisioning Platform (MSPP), a Digital Cross-Connect (DCS), an optical cross-connect, a POTS, an optical switch, a router, a switch, a Wavelength Division Multiplexing (WDM) terminal, an access/aggregation device, etc. That is, the node 30 can be any digital system with ingress and egress digital signals and switching of channels, timeslots, tributary units, etc. While the node 30 is generally shown as an optical network element, the systems and methods contemplated for use with any switching fabric, network element, or network based thereon. Specifically, in the systems and methods described herein, the node 30 is an OTN capable network element, supporting OTSi, OTUCn, and ODUCn.

In an embodiment, the node 30 includes common equipment 32, one or more line modules 34, and one or more switch modules 36. The common equipment 32 can include power; a control module; Operations, Administration, Maintenance, and Provisioning (OAM&P) access; user interface ports; and the like. The common equipment 32 can connect to a management system 38 through a data communication network 40 (as well as a Path Computation Element (PCE), SDN controller, OpenFlow controller, etc.). The management system 38 can include a network management system (NMS), element management system (EMS), or the like. Additionally, the common equipment 32 can include a control plane processor, such as a controller 50 illustrated in FIG. 3 configured to operate the control plane as described herein. The node 30 can include an interface 42 for communicatively coupling the common equipment 32, the line modules 34, and the switch modules 36 to one another. For example, the interface 42 can be a backplane, midplane, a bus, optical or electrical connectors, or the like. The line modules 34 are configured to provide ingress and egress to the switch modules 36 and to external connections on the links to/from the node 30. In an embodiment, the line modules 34 can form ingress and egress switches with the switch modules 36 as center stage switches for a three-stage switch, e.g. a three-stage Clos switch. Other configurations and/or architectures are also contemplated. The line modules 34 can include optical transceivers, such as, for example, Beyond 100G OTN (FlexO, OTUCn, ODUCn, OTSi), Flex OTN, ODUflex, Flexible Ethernet, etc.

Further, the line modules 34 can include a plurality of optical connections per module and each module may include a flexible rate support for any type of connection, such as, for example, N x 100 Gb/s (where N can be a real number), and any rate in between as well as future higher rates. The line modules 34 can include wavelength division multiplexing interfaces, short reach interfaces, and the like, and can connect to other line modules 34 on remote network elements, end clients, edge routers, and the like, e.g., forming connections on the links in the network 10. From a logical perspective, the line modules 34 provide ingress and egress ports to the node 30, and each line module 34 can include one or more physical ports. The switch modules 36 are configured to switch channels, timeslots, tributary units, packets, etc. between the line modules 34. For example, the switch modules 36 can provide wavelength granularity (Layer 0 switching); OTN granularity such as ODUk, ODUCn, ODUflex, ODTUGs, etc.; Ethernet granularity; and the like. Specifically, the switch modules 36 can include Time Division Multiplexed (TDM) (i.e., circuit switching) and/or packet switching engines. The switch modules 36 can include redundancy as well, such as 1:1, 1:N, etc. In an embodiment, the switch modules 36 provide OTN switching and/or Ethernet switching.

Those of ordinary skill in the art will recognize the node 30 can include other components which are omitted for illustration purposes, and that the systems and methods described herein are contemplated for use with a plurality of different network elements with the node 30 presented as an example type of network element. For example, in another embodiment, the node 30 may not include the switch modules 36, but rather have the corresponding functionality in the line modules 34 (or some equivalent) in a distributed fashion. For the node 30, other architectures providing ingress, egress, and switching are also contemplated for the systems and methods described herein. In general, the systems and methods described herein contemplate use with any network element providing switching of channels, timeslots, tributary units, wavelengths, etc. and using the control plane. Furthermore, the node 30 is merely presented as one example node 30 for the systems and methods described herein.

Example Controller

Figure 3:
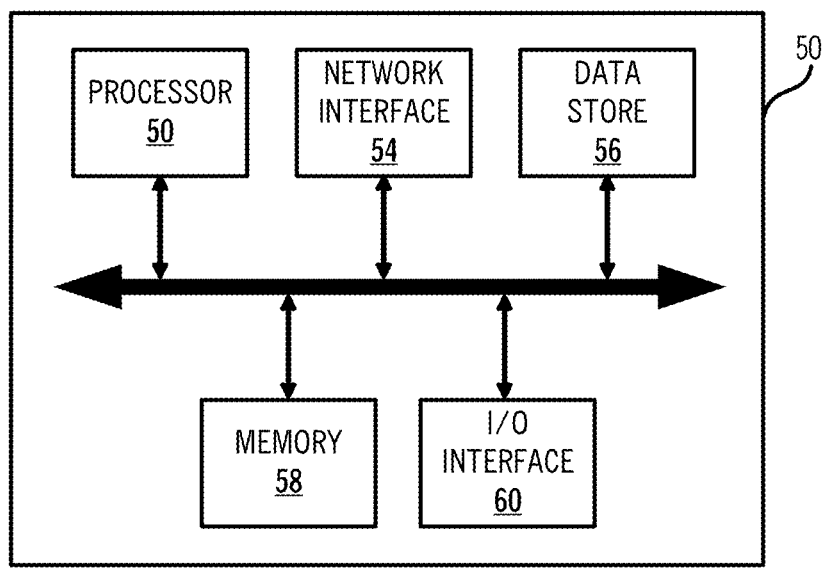
FIG. 3 is a block diagram of a controller to provide control plane processing and/or operations, administration, maintenance, and provisioning (OAM&P) for the node of FIG. 2, and/or to implement a Software Defined Networking (SDN) controller.

Referring to FIG. 3, in an embodiment, a block diagram illustrates a controller 50 to provide control plane processing and/or operations, administration, maintenance, and provisioning (OAM&P) for the node 30, and/or to implement a Software Defined Networking (SDN) controller. The controller 50 can be part of the common equipment, such as common equipment 32 in the node 30, or a stand-alone device communicatively coupled to the node 30 via the DCN 40. In a stand-alone configuration, the controller 50 can be an SDN controller, an NMS, a PCE, etc. The controller 50 can include a processor 52 which is a hardware device for executing software instructions such as operating the control plane. The processor 52 can be any custom made or commercially available processor, a central processing unit (CPU), an auxiliary processor among several processors associated with the controller 50, a semiconductor-based microprocessor (in the form of a microchip or chip set), or generally any device for executing software instructions. When the controller 50 is in operation, the processor 52 is configured to execute software stored within the memory, to communicate data to and from memory, and to generally control operations of the controller 50 pursuant to the software instructions. The controller 50 can also include a network interface 54, a data store 56, memory 58, an I/O interface 60, and the like, all of which are communicatively coupled to one another and to the processor 52.

Note, while the controller 50 is shown as a separate module in the node 30 and as part of the common equipment 32, the controller 50 and its associated functionality can be located elsewhere in the node 30 and even external to the node 50. Also, the controller 50 can be implemented on the line modules 34, the switch modules 36, etc.

The network interface 54 can be used to enable the controller 50 to communicate on the DCN 40, such as to communicate control plane information to other controllers, to the management system 38, to the nodes 30, and the like. The network interface 54 can include, for example, an Ethernet card (e.g., Gigabit Ethernet) or a wireless local area network (WLAN) card (e.g., 802.11). The network interface 54 can include address, control, and/or data connections to enable appropriate communications on the network. The data store 56 can be used to store data, such as control plane information, provisioning data, OAM&P data, etc. The data store 56 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 56 can incorporate electronic, magnetic, optical, and/or other types of storage media. The memory 58 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 58 may incorporate electronic, magnetic, optical, and/or other types of storage media. Note that the memory 58 can have a distributed architecture, where various components are situated remotely from one another, but may be accessed by the processor 52. The I/O interface 60 includes components for the controller 50 to communicate with other devices. Further, the I/O interface 60 includes components for the controller 50 to communicate with the other nodes, such as using overhead associated with OTN signals.

In an embodiment, the controller 50 is configured to communicate with other controllers 50 in the network 10 to operate the control plane for control plane signaling. This communication may be either in-band or out-of-band. Out-of-band signaling may use an overlaid Internet Protocol (IP) network such as, for example, User Datagram Protocol (UDP) over IP. In an embodiment, the controllers 50 can include an in-band signaling mechanism utilizing OTN overhead. The General Communication Channels (GCC) defined by G.709 are in-band side channels used to carry transmission management and signaling information within Optical Transport Network elements. Based on the intermediate equipment's termination layer, different bytes may be used to carry control plane signaling. Other mechanisms are also contemplated for control plane signaling.

The controller 50 is configured to operate the control plane 16 in the network 10. That is, the controller 50 is configured to implement software, processes, algorithms, etc. that control configurable features of the network 10, such as automating discovery of the nodes, capacity on the links, port availability on the nodes, connectivity between ports; dissemination of topology and bandwidth information between the nodes; path computation and creation for connections; network level protection and restoration; and the like. As part of these functions, the controller 50 can include a topology database that maintains the current topology of the network 10 based on control plane signaling (e.g., HELLO messages) and a connection database that maintains available bandwidth on the links 14 again based on the control plane signaling. Again, the control plane is a distributed control plane; thus, a plurality of the controllers 50 can act together to operate the control plane using the control plane signaling to maintain database synchronization. In source-based routing, the controller 50 at a source node for a connection is responsible for path computation and establishing by signaling other controllers 50 in the network 10, such as through a SETUP message. Path computation generally includes determining a path, i.e. traversing the links through the nodes from the originating node to the destination node based on a plurality of constraints such as administrative weights on the links, bandwidth availability on the links, etc.

Network Service Employing Multiple Optical Carriers

Figure 4:
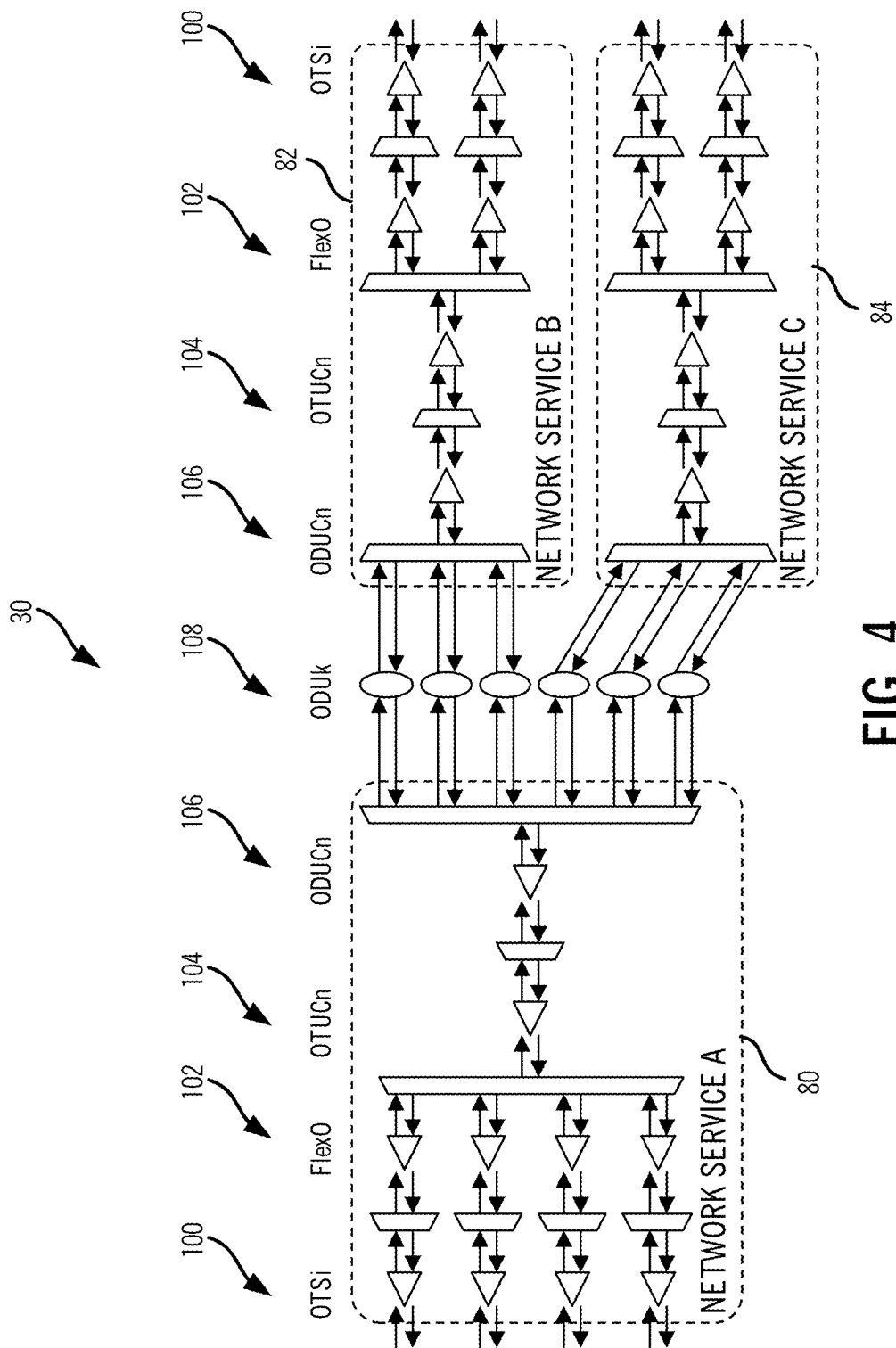
FIG. 4 is a network diagram of an example of network services within a node which have ODUk services as channelized services being carried on an OTUCn network interface with multiple OTSi carriers.

Referring to FIG. 4, in an embodiment, a network diagram illustrates an example of network connections 80, 82, 84 within a node 30 which have ODUk clients/services as channelized services being carried on an OTUCn network interface with multiple OTSi carriers. The network connections 80, 82, 84 include OTSi 100, FlexO 102, OTUCn 104, and ODUCn 106. The network services or clients are ODUk 108. The OTSi 100 is defined in ITU Recommendation G.959.1 "Optical transport network physical layer interfaces," (04/2016), the contents of which are incorporated by reference. The OTSi is an optical signal that is placed within a network media channel for transport across the optical network. This may include a single modulated optical carrier or a group of modulated optical carriers or subcarriers. In this example, the network connection 80 includes four OTSi 100 and the network connections 82, 84 each includes two OTSi 100. The FlexO 102 is a group interface which includes multiple homogeneous OTN interfaces to support a higher rate client, e.g., nxOTUC1. The OTUCn 104 is a single network group interface, and in this example, there is one OTUCn for each of the network connections 80, 82, 84. The OTUCn 104 and the ODUCn 106 are defined in G.709 (06/2016). The OTUCn contains an ODUCn 106, and the ODUCn 106 contains an Optical Payload Unit (OPUCn). The ODUk 108 is a single channelized client or service, and in this example, there are six channelized services shown. The network connection 80 employs four OTSi 100 carriers and is carrying six ODUk 108 channelized services. The network connections 82, 84 each employ two OTSi 100 carriers, and each carries three ODUk 108 channelized services.

Those of ordinary skill in the art will recognize the node 30 in FIG. 4 is shown with the three example network connections 80, 82, 84 for illustration purposes. Specifically, FIG. 4 illustrates the network connection 80 facing west and the network connections 82, 84 facing east with each of the six ODUk 108 channelized services between the network connection 80 and between the network connections 82, 84. Other embodiments are also contemplated, such as the network connection 80 interfacing another network service of the same size (in FIG. 4, the network connection 80 interfaces the network connection 82, 84 which are each half the size of the network connection 80).

Additionally, the examples described herein reference OTN, namely OTSi, OTUCn, ODUCn, and those of ordinary skill in the art will recognize the systems and methods described herein can also be applied to other techniques such as Flexible Ethernet or the like.

Again, typically upon a failure of any OTSi 100 carriers on any of the network connections 80, 82, 84, the entire OTUCn 104 network group interface is considered to be failed and consequent actions are applied across the entire ODUCn 106 layer, affecting all the ODUk 108 services within. The same analogy can be used for FlexO client interfaces carrying a single HO OTUCn HO and multiple LO ODUk services LO. Again, the same analogy can be used for FlexE clients carried in a FlexE group interface.

Bandwidth within a Network Service Example

Figure 5:
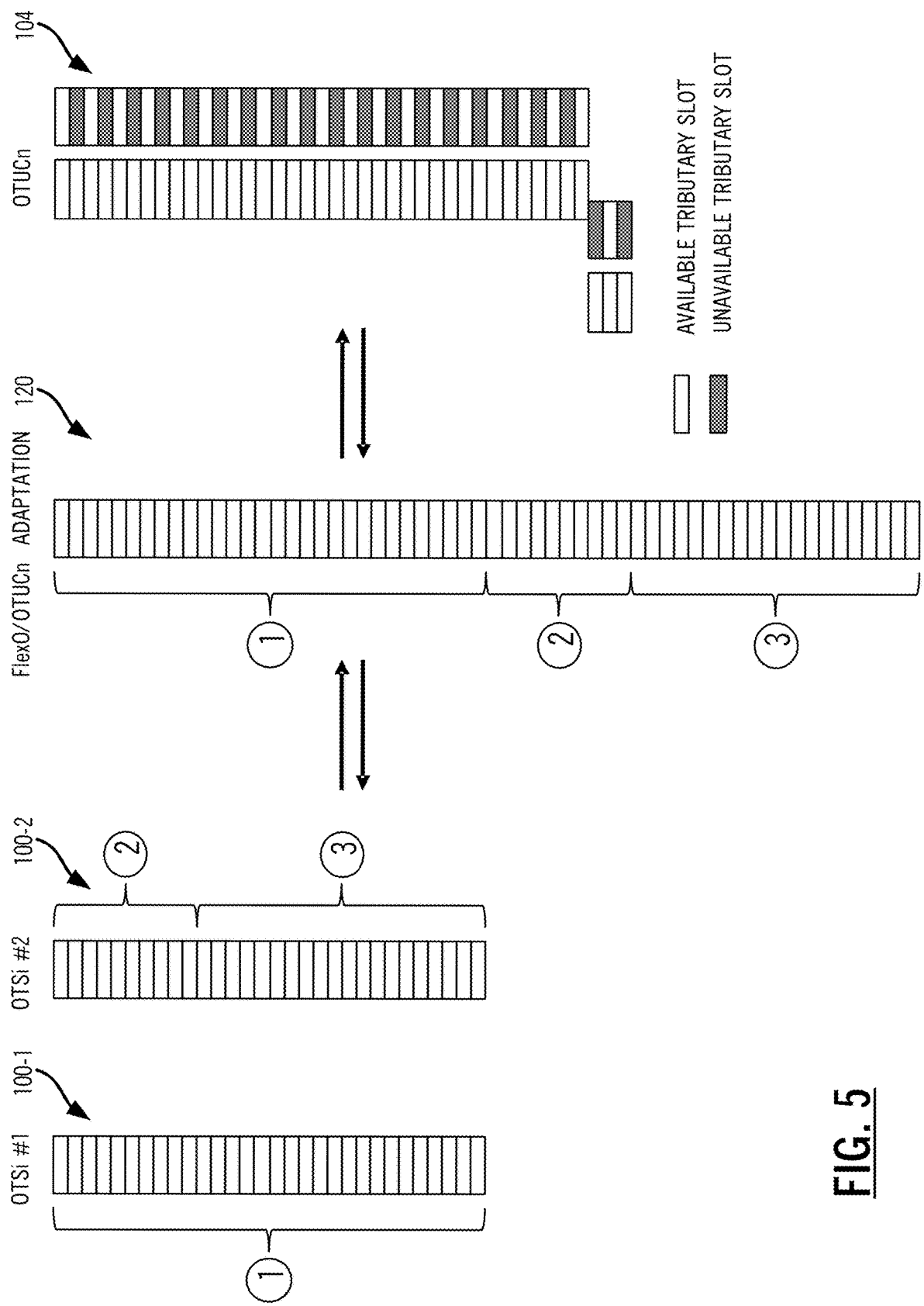
FIGS. 5-7 are block diagrams of bandwidth for network services and how it can be assigned to specific optical carriers, OTSi, specifically
Figure 6:
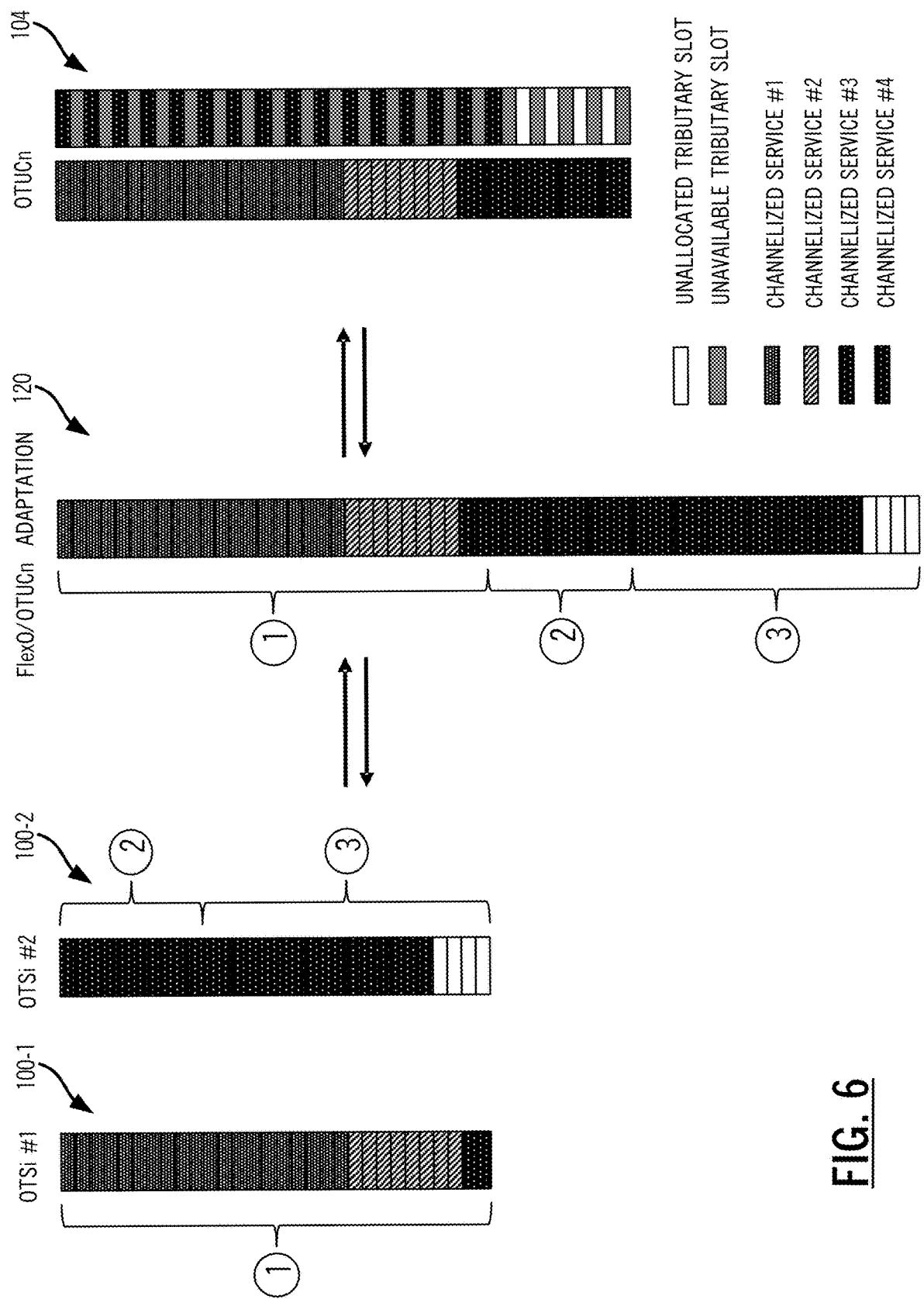
Figure 7:
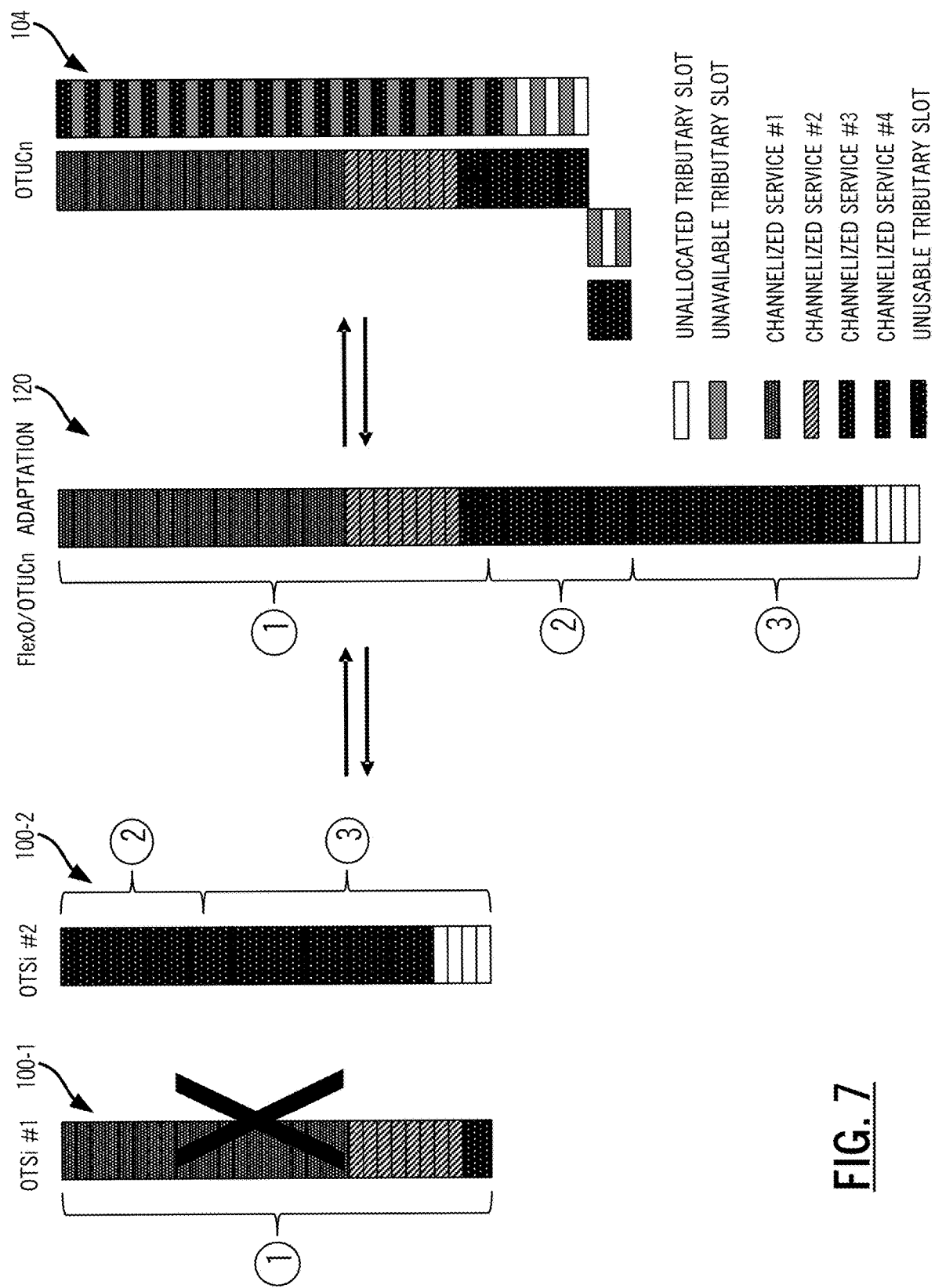

Referring to FIGS. 5-7, in an embodiment, block diagrams illustrate bandwidth for network services and how it can be assigned using a time domain multiplexing scheme to specific optical carriers, OTSi. FIG. 5 illustrates how available bandwidth can be identified for network services. FIG. 6 illustrates how services can be allocated to available bandwidth and how that bandwidth can be carried across multiple optical carriers, OTSi. FIG. 7 illustrates a failure on a single optical carrier, OTSi, and how the bandwidth for the network services is identified and adjusted accordingly. In FIGS. 5-7, there are two OTSi 100-1, 100-2 carriers with various boxes identifying a unit of bandwidth. To carry bandwidth on the OTSi 100-1, 100-2 carriers, there is a FlexO/OTUCn adaptation 120 which maps bandwidth from the OTUCn 104 to the OTSi 100-1, 100-2 carriers. Note, the concept of the OTSi 100 and the OTUCn 104 is meant to decouple Layer 1 OTN bandwidth (client layer) from Layer 0 DWDM bandwidth (server layer). Specifically, as new modulation formats emerge, optical bandwidth is decoupled from client/service bandwidth. In the OTUk scheme, each wavelength typically carried a single HO OTUk. With the OTSi 100 and the OTUCn 104, there can be various combinations such as, for example, an OTUC4 (400G) carried on two OTSi (each at 200G), and the like.

In FIG. 5, it is shown that tributary slots from the FlexO/OTUCn adaptation 120 are assigned to tributary slots in the OTSi 100-1, 100-2 carriers, and not necessarily on the same OTSi 100-1, 100-2 carrier. At the adaptation layer into the FlexO/OTSiG (OTSi Group) only those tributary slots which are available can be considered. In this example, the tributary slots identified by 1 are carried by the OTSi 100-1 and the tributary slots identified by 2 and 3 are carried by the OTSi 100-2. FIG. 6 shows how channelized services can be allocated to available bandwidth, and how that bandwidth can be carried across multiple carriers. In this example, channelized service #1 and #2 are carried entirely within the OTSi 100-1, a channelized service #4 is carried entirely within the OTSi 100-2, but a channelized service #3 is carried partially by each of the OTSi 100-1, 100-2. Same analogy can be used with FlexE clients assigned to calendar slots.

FIG. 7 shows a failure on a single optical carrier, the OTSi 100-1, and how the system can identify and indicate that the bandwidth has been reduced for a given service. In this example, the failure of the OTSi 100-1 completely affects the services #1 and #2 and affects two of the eight tributary slots which are allocated to the channelized service #3. The channelized service #4 is unaffected by the failure of the OTSi 100-1 since it is entirely carried on the OTSi 100-2. If the channelized service #3 is flexible, it can be automatically reduced to use only the usable bandwidth (six tributary slots in this example) to still carry service, albeit with lower bandwidth, during the temporary failure. The amount of available bandwidth would need to be apparent at the node 30 where the service is added/dropped so that the service can be throttled according to how much bandwidth it can use through the network. Also, the channelized services #1 and #2 can be restored while the channelized service #4 does not need to be restored. Same analogy can be used with FlexE clients assigned to calendar slots.

In an OTUCn network, mesh restoration and the control plane 16 can be used to move or resize affected services. Detection of which services have failed (as opposed to those which are still able to carry traffic) in an interface can be accomplished by the controller 50, an NMS, the SDN controller 18, or the like. The detection can be accomplished via status monitoring for the service across the domain, by monitoring of fault points (with no hold-off/debounce being applied) at either the point of failure or at adjacent equipment, by an implied association maintained in the node of which service is carried on which optical carrier, and the like.

Services which have been identified as failed have multiple possible actions which could be applied. First, mesh restoration and the control plane 16 can be used to move or resize only the affected services, as opposed to all services from within the group interface, to available bandwidth within other existing interfaces in the network. In the example of FIG. 7, this includes moving the channelized services #1 and #2 and resizing or moving the channelized service #3. Additionally, services within the affected interface could be shuffled, allowing higher prioritized services to be carried via the reduced bandwidth of the existing partially failed interface. In the example of FIG. 7, this could include moving the channelized service #3 and replacing it with the channelized service #1 in the OTSi 100-2, if, for example, the channelized service #1 is a higher priority than the channelized service #3. Alternatively, this could include reducing the sizes of all of the channelized services such that they could all be carried on the OTSi 100-2. Controllers across layer 0 and layer 1 can be integrated to create new interfaces which only need to be large enough to accommodate the services which need to be moved.

The node 30 is aware of the bandwidth within the network interface (OTUCn in this example) which is being carried by each optical carrier, OTSi. If any channelized services do not employ bandwidth that is impacted by the failed optical carriers (the OTSi 100-1 in this example), those channelized services will not have consequent actions applied and thus will continue to carry traffic through the network. So, as an example, when the OTSi 100-1 fails, the node 30 would determine that the bandwidth being carried by the OTSi 100-1 corresponds to the channelized services #1, #2 and #3. Those individual channelized services would have consequent actions applied, but the channelized service #4 would remain unaffected. Referring back to FIG. 4, the consequent actions would be applied at the adaptation between the ODUk services and the ODUCn high order path.

Subsequent nodes 30 along the traffic path will be unaffected by the upstream optical carrier faults, and the channelized service will pass through regardless of whether it contains an alarm condition or not.

If the channelized service is flexible in how much capacity it can carry through a network, it may be possible for the channelized service to adapt to the partial failure of the network service. When specific tributary slots for a channelized service are failed due to the failed optical carrier (two tributary slots for the channelized service #3 in the example of FIG. 7), but other tributary slots are not failed because they are contained within an optical carrier that is not failed, the equipment may be able to temporarily adapt the size of the service to the number of non-failed tributary slots through the network service. This requires throttling of the service being carried within the channel at the points where it enters the network or moving it entirely across another path. Once the failure within the network has been recovered, the channelized service can also recover to its original capacity (or location).

Process for Shuffling Services

Figure 8:
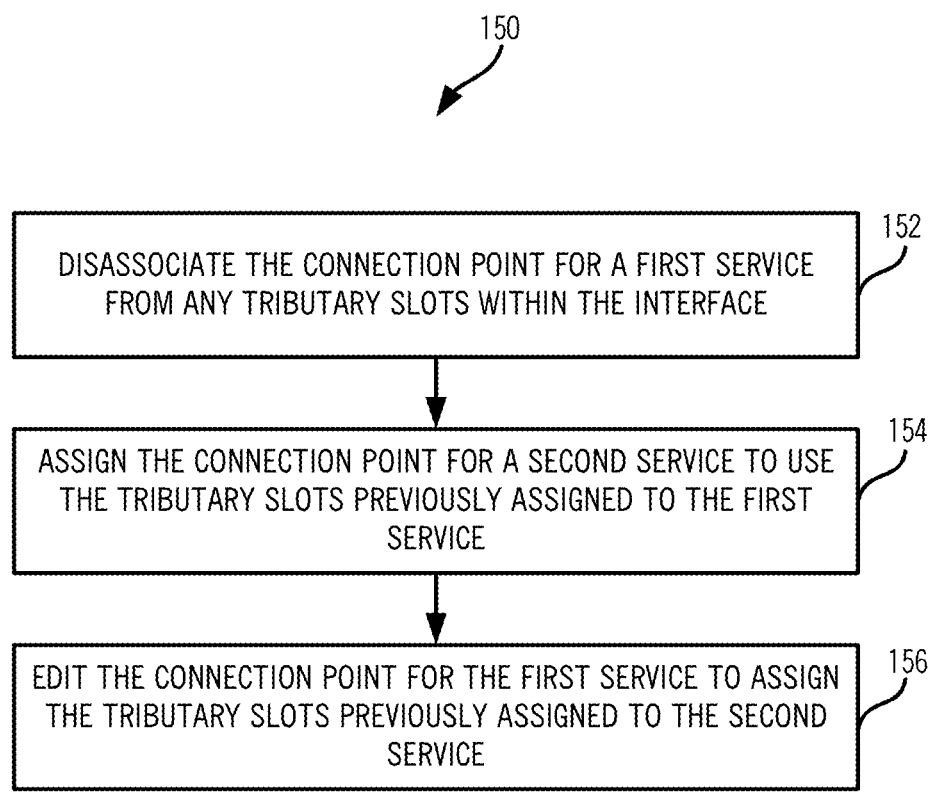
FIG. 8 is a flowchart of a process for shuffling services within a partially failed interface to move high priority services to non-failed tributary slots

Referring to FIG. 8, in an embodiment, a flowchart illustrates a process 150 for shuffling services within a partially failed interface to move high priority services to non-failed tributary slots. The process 150 is implemented in or by a node 30, e.g., through the control plane 16 or the SDN controller 18, and is done via an Edit operation in order to prevent loss of any existing provisioning data that may result if any entity is deleted and re-added with new tributary slot assignments. In the example of FIG. 7, the process 150 could be used to move the two tributary slots of the channelized service #3 on the OTSi 100-1 to two tributary slots in the OTSi 100-2.

Reassigning tributary slot assignments between two services within the same interface becomes a sequence of the following events in the process 150. The process 150 includes disassociating the connection point for a first service from any tributary slots within the interface (step 152). The Multiplex Structure Identifier (MSI) structure for the High Order OPU will now show those tributary slots as unallocated. The same analogy can be used for FlexE calendar slots. The egress tributary slots would be empty within the payload of the High Order OPU. Because there is no ingress data from the interface, the connection function for the service detects an AIS defect from the interface. Next, the process 150 includes assigning the connection point for a second service to use the tributary slots previously assigned to the first service (step 154) and editing the connection point for the first service to assign the tributary slots previously assigned to the second service (step 156).

P-AIS, P-BDI, and Overhead Movement

Figure 9:
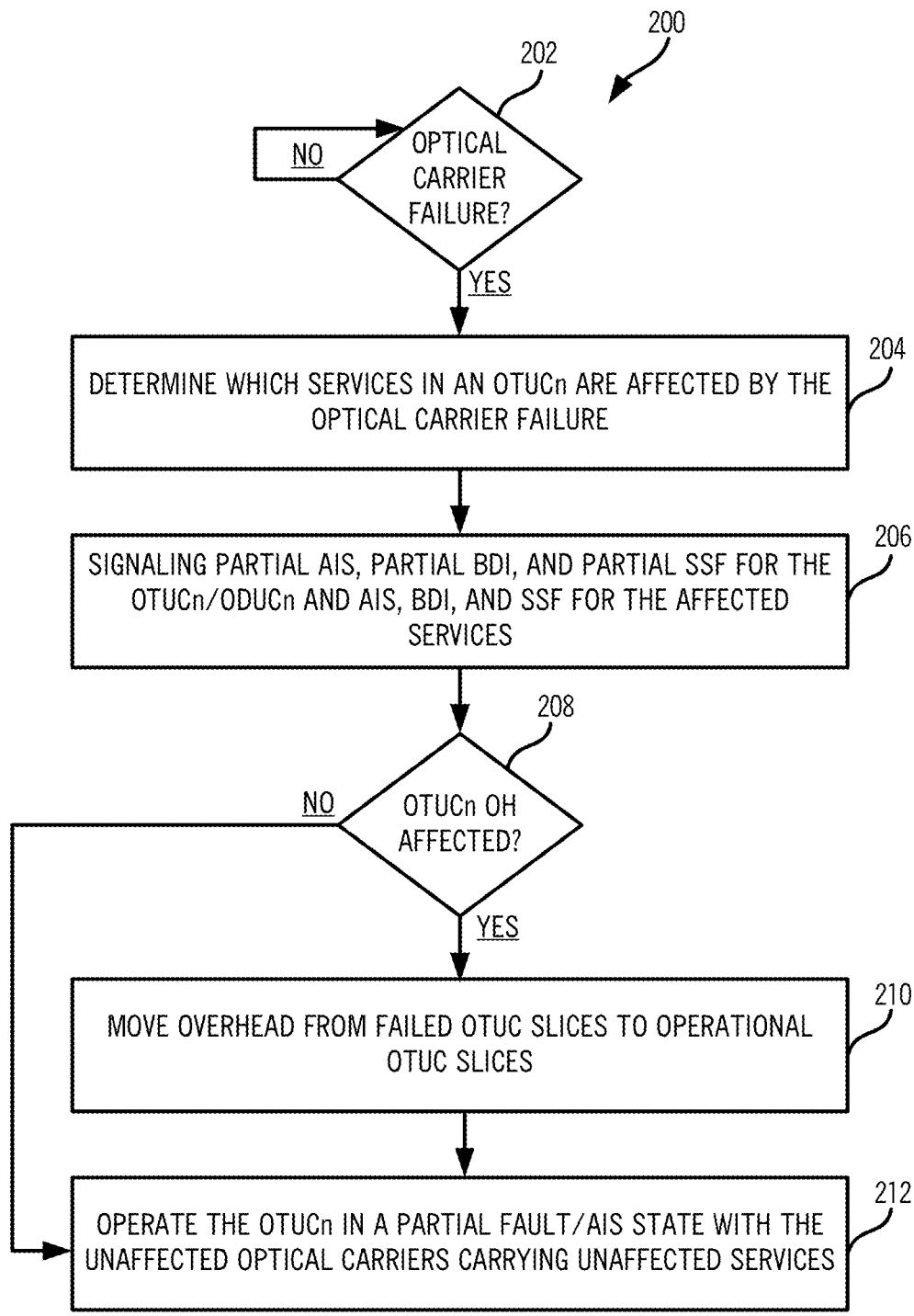
FIG. 9 is a flowchart of an overhead processing process which uses partial AIS and BDI signals and overhead movement for partial survivability of multi-carrier and multi-module optical interfaces.

Referring to FIG. 9, in an embodiment, a flowchart illustrates an overhead processing process 200 which uses partial AIS and BDI signals and overhead relocation for partial survivability of multi-carrier and multi-module optical interfaces. The process 200 is performed by the node 30 to enable partial survivability, and the node 30 includes a plurality of optical carriers, OTSi, an OTUCn associated with the optical carriers, and a plurality of ODUk services. The process 200 initiates subsequent to detection of an optical carrier failure (step 202). For example, in FIG. 7, the OTSi 100-1 fails. As described herein, the optical carrier failure can be due to equipment failure, e.g., optical modems, as opposed to fiber cuts. The equipment failure affects a specific optical carrier whereas the fiber cuts can affect all optical carriers on the same fiber. Although the process 200 can operate with respect to fiber cuts where the optical carriers for an OTUCn are on different fibers.

The process 200 includes determining which ODUk services in the OTUCn are affected by the optical carrier failure (step 204). Again, detection of which services have failed (as opposed to those which are still able to carry traffic) can be accomplished by the controller 50, an NMS, the SDN controller 18, or the like. In the example of FIG. 7, the channelized services #1 and #2 would be the ones fully affected by the OTSi 100-1 failure and the channelized service #3 would be partially affected.

The process 200 includes signaling partial AIS, partial BDI, and partial SSF for the OTUCn/ODUCn and AIS, BDI, and SSF for the affected services (step 206). Again, ODUCn AIS is currently defined as all or nothing. The process 200 introduces the concept of squelching only selected (failed) ODUC slices, resulting in new P-AIS, P-BDI, and P-SSF states for the overall OTUCn/ODUCn. These P-AIS, P-BDI, and P-SSF states are applied to OTUC and ODUC which are affected by the optical carrier failure. Again, consequential actions by the node 30, the OTN network, etc., are applied at the ODUk service level based on the HO P-AIS, and P-SSF. Specifically, the affected ODUk services see the HO AIS, and SSF states whereas the unaffected ODUk services do not. The new P-AIS, P-BDI, and P-SSF can be a replacement signal and STAT field for only the HO OTUC/ODUC slices which are affected by the optical carrier failure. The actions can include resizing, redialing/restoring, moving, etc. performed by a control plane, SDN, etc. Again, resizing can be used when a service is only partially affected by the optical carrier failure such that the service remains with the operational timeslots. The redialing/restoring can include control plane restoration such as mesh restoration and it is only performed on the services with the AIS, BDI, and SSF. That is, operational services not affected by the optical carrier failure do not need restoration. The moving can include replacing the affected services with unaffected services as described herein, such as based on priority. Specifically, an OTUCn in any of the P-AIS, P-BDI, and P-SSF states means this OTUCn has failed optical carriers and operational optical carriers, hence a partial survivability state.

The process 200 includes determining if the OTUCn overhead has been affected by the optical carrier failure (step 208). Specifically, in order to continue operating an OTUCn interface in a partial fault/AIS state, some critical overhead must be moved from failed OTUC/ODUC slices onto good ones. In an OTUCn, OTUCn, ODUCn, and OPUCn contain n instances of OTU, ODU, OPU overhead, numbered 1 to n. In some embodiments, the first instance (OTUC #1, ODUC #1, and OPUC #1) overhead is used for various OAM&P purposes. For example, the first OTUC slice can be used to carry specific overhead such as trace identification information (TTI) and General Communication Channel (GCC) data. At step 208, it is determined whether or not the optical carrier failure affects the OTUCn overhead, such as, for example, the optical carrier affecting the first OTUC #1 slice.

If the optical carrier failure affects the OTUCn overhead (step 208), the process 208 includes moving overhead from failed OTUC slices to an operational OTUC slice (step 210). If the optical carrier failure does not affect the overhead (step 208) then after step 210, the process 200 includes operating the OTUCn in a partial fault/AIS state with the unaffected optical carriers carrying unaffected services (step 212).

The moving in step 210 can be achieved via various techniques. First, a source (transmitter) can use the P-BDI backward/remote defect indication to decide which OTU/ODU to send its overhead with a bit signaling overhead presence. In cases of bi-directional failures, the transmitter can also use its receiver status. Basically, if it receives a local or remote failure indicator, then the overhead is moved. Second, the source can broadcast the overhead to all slices, with identical copies. A weighted scheme can be used by the sink (receiver) so that it can decide which overhead is valid in cases where there are discrepancies.

Layer 0 and Layer 1 Integration

With partial survivability, integration across Layer 0 and Layer 1 controllers could allow right-sizing of existing and new interfaces based explicitly on the services which need to be carried. The existing, partially failed interface, could be resized since it does not currently need to accommodate the failed services. This could potentially free up optical bandwidth (wavelengths) by adjusting the make-up of the interface (add or remove OTSi). A new interface which is created only requires enough bandwidth to accommodate only the failed services which need to be moved, as opposed to all services from within the failed interface. This could result in the consumption of less optical bandwidth (wavelengths) within the optical network. The total capacity of an interface can be adjusted when it is not possible for any service in the client layer to use the stranded capacity. This generally results in a wavelength which requires less SNR, and therefore could provide additional net system margin back to the network (e.g., downshift from 150G using 8 Quadrature Amplitude Modulation (QAM) to 100G using Quadrature Phase Shift Keying (QPSK) because the additional 50G capacity offered by the 8QAM is not usable by the 100G services). The resultant required SNR for the lower capacity modulation (from 8QAM to QPSK) can be absorbed by the network once the margin has been mined from the wavelength (e.g., via power spectral averaging) and used for additional capacity on other wavelengths.

Example OTUCn Network Configurations

Figure 10:
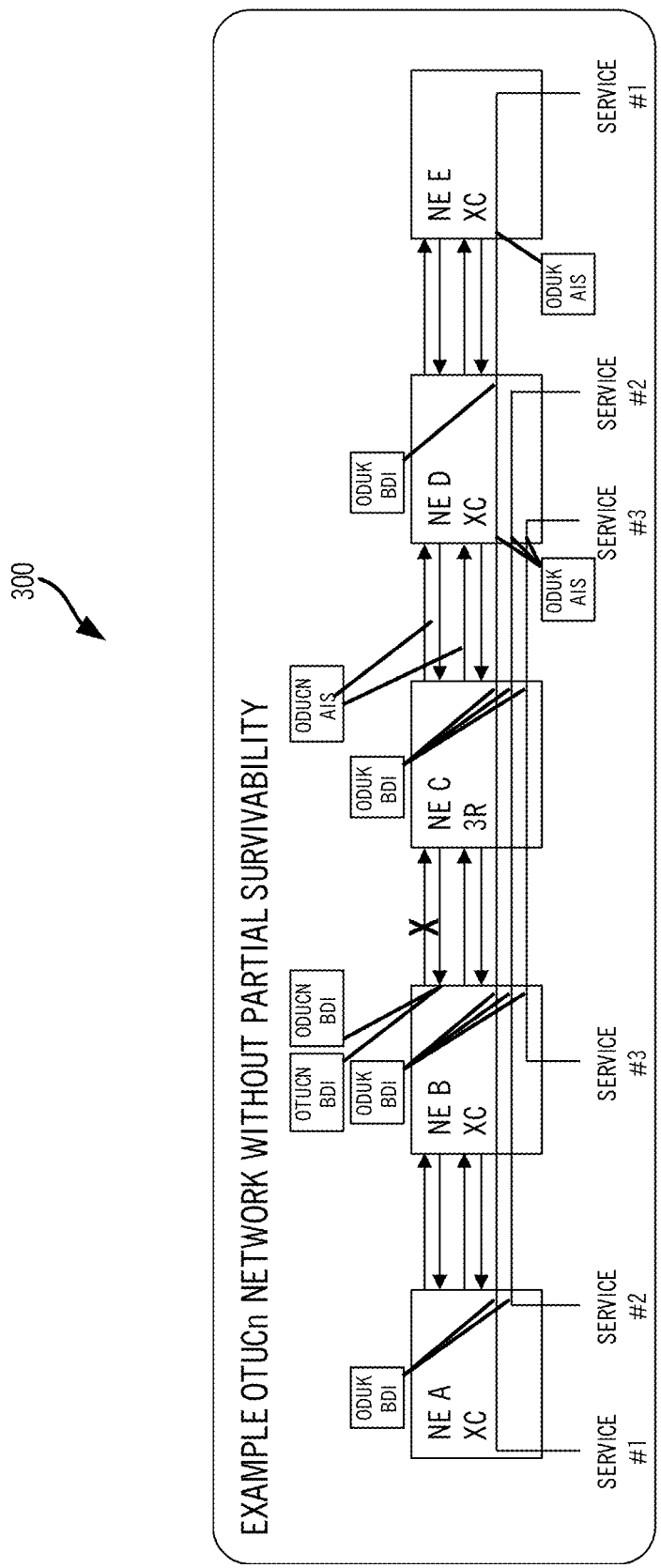
FIGS. 10-12 are network diagrams of a network illustrating various OTUCn network configurations (mix of OTN XC cross-connects and 3R regeneration nodes), specifically
Figure 11:
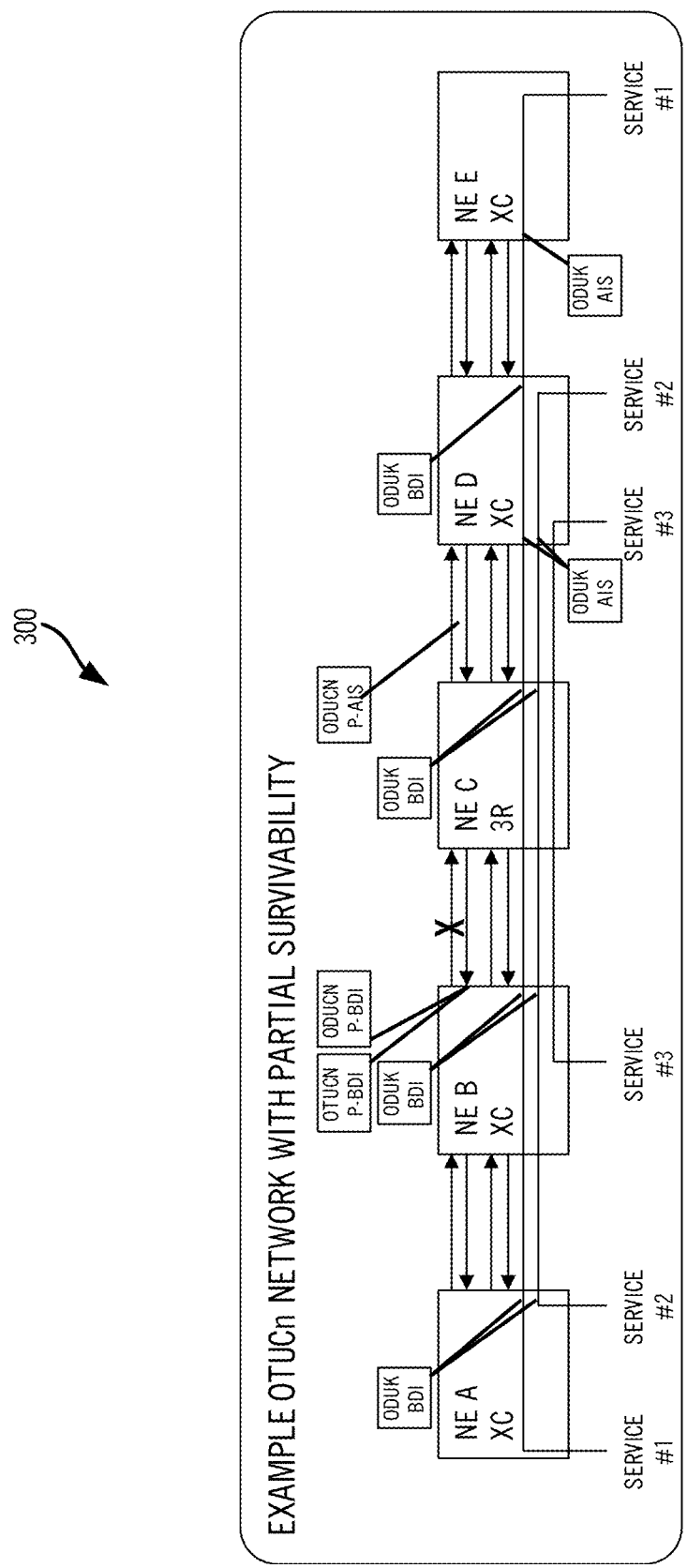
Figure 12:
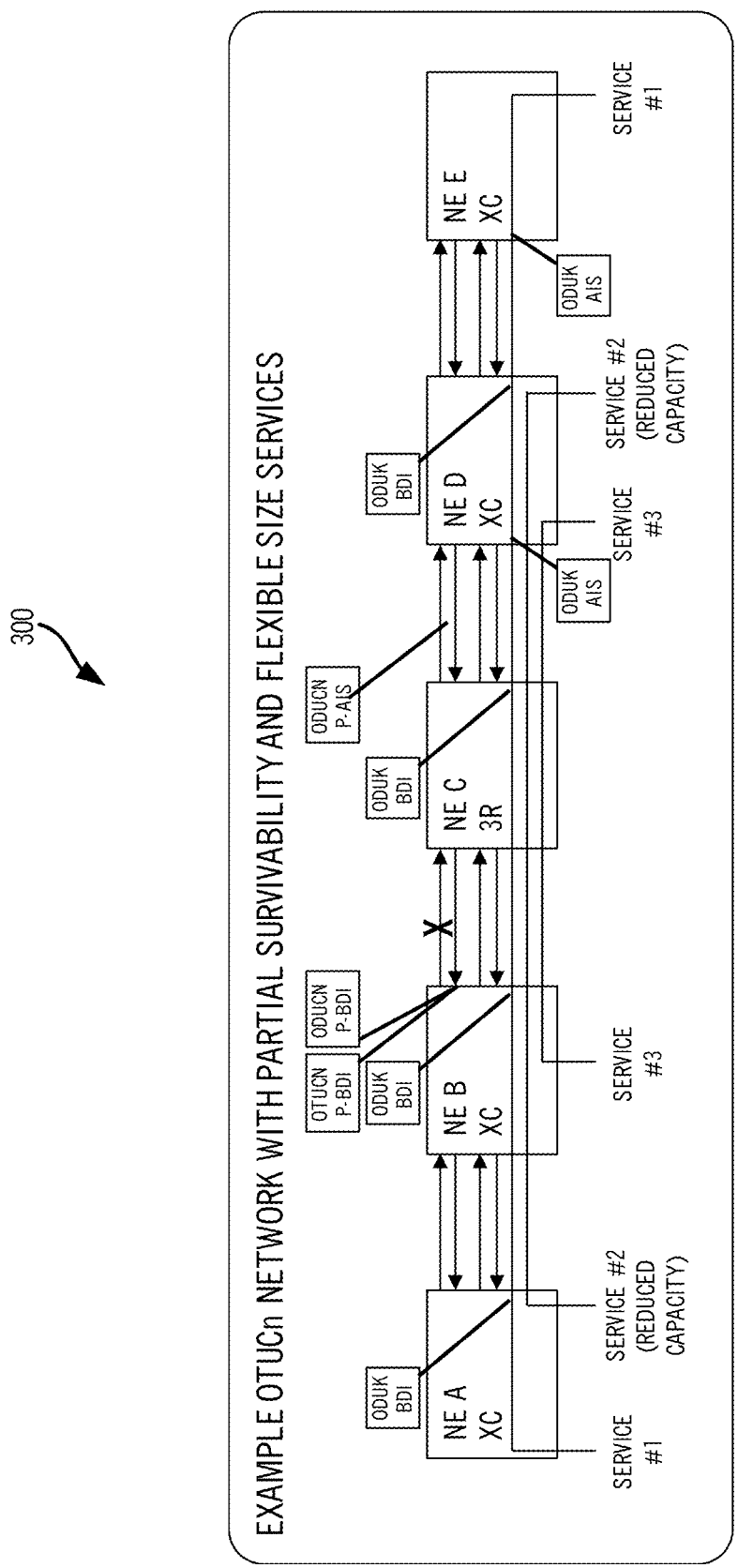

Referring to FIGS. 10-12, in embodiments, network diagrams illustrate a network 300 illustrating various OTUCn network configurations. FIG. 10 illustrates the OTUCn network 300 without partial survivability, FIG. 11 illustrates the OTUCn network 300 with partial survivability and FIG. 12 illustrates the OTUCn network 300 with partial survivability and with flexible size services. The OTUCn network 300 is shown with five example nodes or network elements, namely NE A, NE B, NE C, NE D, NE E. The network elements NE A, B, D, E are cross-connects (XC) and the network element NE C is a regenerator (3R) from the perspective of example services #1, #2, #3. There are two optical carriers OTSi between each of the network elements with the NE A and the NE E as end nodes and the NE B, NE C, NE Das intermediate nodes. The service #1 is between the NE A and the NE E traversing each of the NE B, NE C, NE D. The service #2 is between the NE A and the NE D traversing each of the NE B, NE C. The service #3 is between the NE B and the NE D traversing the NE C.

In all of the FIGS. 10-12, an optical carrier failure is shown on the first optical carrier OTSi between the NE B and the NE C. In FIG. 10, the OTUCn network does not have partial survivability. As such, AIS and BDI are shown on all of the services #1, #2, #3. After the optical carrier failure, ODUk BDI is sent backward on each of the services #1, #2, #3 and an ODUk AIS is sent forward on each of the services #1, #2, #3. Similarly, there is an OTUCn BDI and ODUCn BDI sent backward on the OTUCn and ODUCn, respectively, and an ODUCn AIS is sent forward on the ODUCn. All of the services #1, #2, #3 are down, whether or not they are affected by the optical carrier failure.

In FIG. 11, the OTUCn network 300 can implement the systems and methods described herein for partial survivability, such as the process 200. For example, assume the services #1, #2 are affected by the optical carrier failure between the NE B and NE C whereas the service #3 is not. After the optical carrier failure, ODUk BDI is sent backward only on the services #1, #2 and an ODUk AIS is sent forward only on the services #1, #2. Similarly, there is an OTUCn P-BDI and ODUCn P-BDI sent backward on the OTUCn and ODUCn, respectively, and an ODUCn P-AIS is sent forward on the ODUCn. Accordingly, only the services #1, #2 are down whereas the service #3 is unaffected and the OTUCn/ODUCn is now operated in a partial failure situation as designated by the P-AIS, P-BDI, and P-SSF. The OTUCn network 300 can apply consequential actions only to the services #1, #2, i.e., restoration, resizing, moving, etc.

In FIG. 12, the OTUCn network 300 can implement the systems and methods described herein for partial survivability, such as the process 200, as well as service resizing. In this example, assume the service #1 is fully affected by the optical carrier failure between the NE B and NE C, the service #2 is partially affected by the optical carrier failure, and the service #3 is not. After the optical carrier failure, ODUk BDI is sent backward only on the service #1 and an ODUk AIS is sent forward only on the service #1. The service #2 is resized to occupy only its tributary slots on the second, unaffected optical carrier, thus operating with reduced capacity. Similarly, there is an OTUCn P-BDI and ODUCn P-BDI sent backward on the OTUCn and ODUCn, respectively, and an ODUCn P-AIS is sent forward on the ODUCn. Accordingly, only the service #1 is down whereas the service #3 is unaffected and the service #2 operates with reduced capacity, and the OTUCn/ODUCn is now operated in a partial failure situation as designated by the P-AIS, P-BDI, and P-SSF. The OTUCn network 300 can apply consequential actions only to the service #1, i.e., restoration, resizing, moving, etc.

OTUCn/ODUCn Overhead

Figure 13:
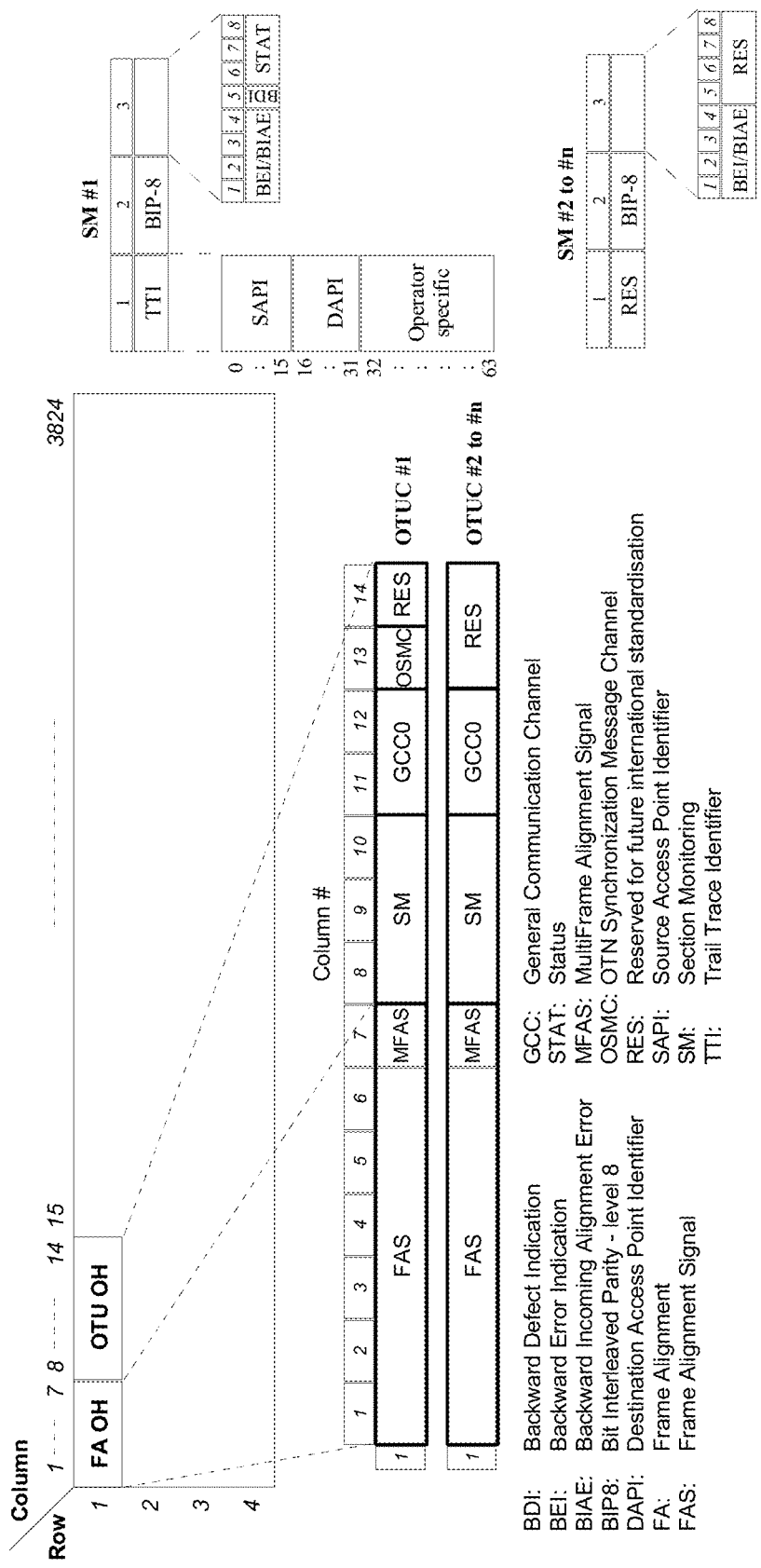
FIGS. 13-14 are block diagrams of OTUCn/ODUCn overhead.
Figure 14:
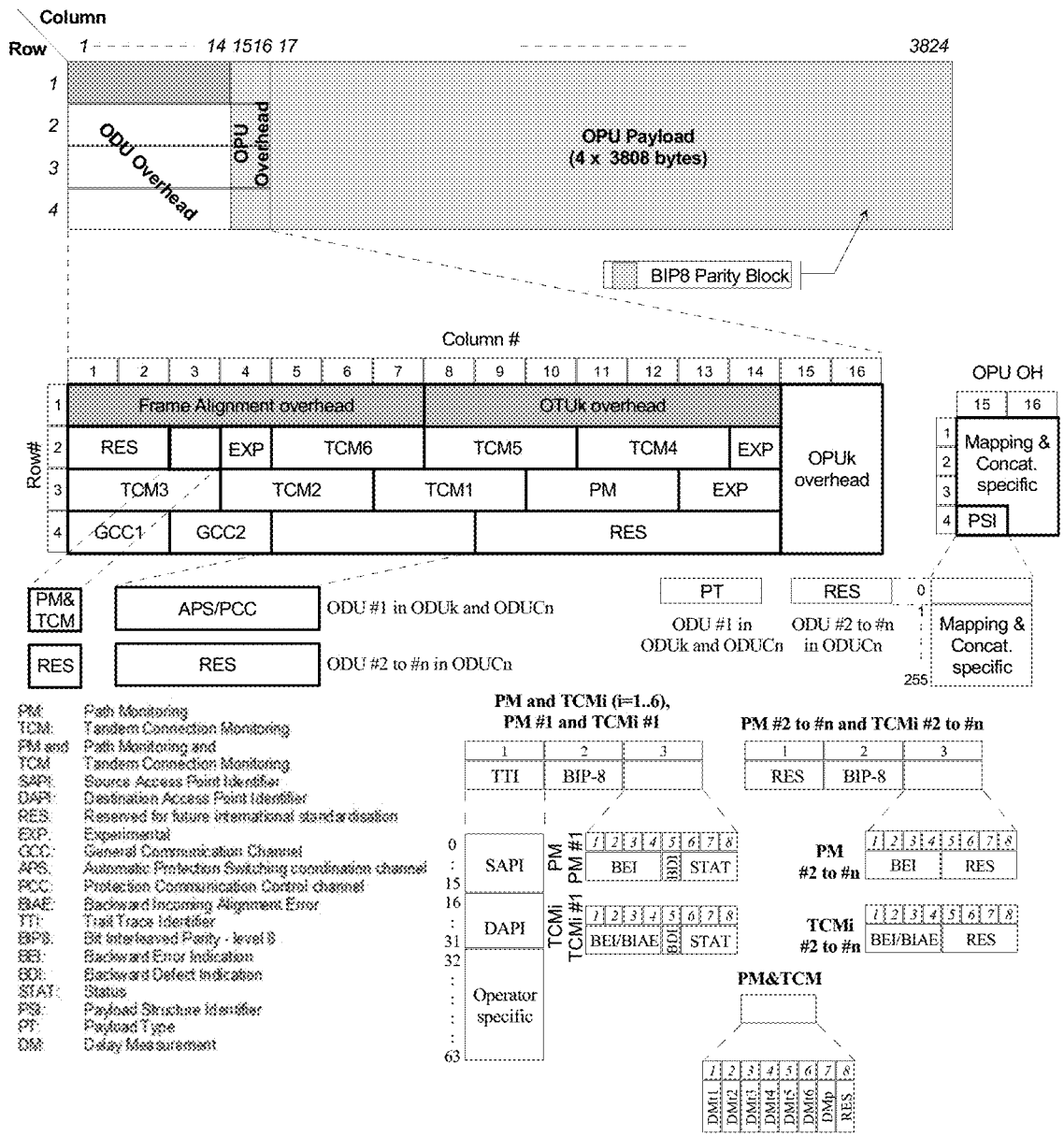

Referring to FIGS. 13-14, in an embodiment, block diagrams illustrate OTUCn/ODUCn overhead. Specifically, FIG. 13 illustrates the OTUCn frame structure, frame alignment and OTUCn overhead, and FIG. 14 illustrates the ODUCn frame structure, ODUCn and OPUCn overhead. As can be seen in FIGS. 13-14, the overhead is different for OTUC #1, ODUC #1, and OPUC #1 versus #2 to #n. Specifically, in FIG. 13, the OTUC #1 carriers the OTN Synchronization Message Channel (OSMC) and the Trail Trace Identifier (TTI) whereas #2 to #n do not. In FIG. 14, the ODUC #1 carriers the Path Monitoring (PM), Tandem Connection Monitoring (TCM), Automatic Protection Switching (APS), Protection Communication Channel (PCC), Payload Type (PT), and TTI whereas #2 to #n do not. As such, the process 300 includes various techniques to ensure this overhead survives in the partial survivability state by moving this overhead out of the OTUC #1 or ODUC #1 when that is affected by the optical carrier failure.

FlexE

The aforementioned descriptions of partial survivability focus on an OTUCn implementation. Those of ordinary skill in the art will recognize the same approaches can be used with FlexE. Specifically, a FlexE group can include multiple FlexE clients and a failure of one FlexE server or interface within the group can lead to partial survivability. Here, the services are FlexE clients and the network interface is the FlexE group. The failed FlexE clients can be determined based on the calendar slots in the FlexE shim. Instead of an AIS, FlexE would have a partial LF, and instead of a BDI, FlexE would have a Remote PHY Fault (RPF).

FlexO/ZR Interfaces

As described herein, the concept of partial survivability was originally conceived when multiple interfaces (OTSi) in a group (OTSiG) are used to carry a single OTUCn service. Standard behavior would require that when a member interface (OTSi) in the group fails, the whole group fails. Partial survivability will keep some services alive and running hitlessly even in the event of failure with another OTSi in the group. This concept applies well for hitless subrating use cases.

FlexO/OTUCn interfaces include 100G OTUC slices and FlexO instances. As is known in the art, a slice here is a 100G signal. Similarly, 400ZR (and future 800ZR/LR) interfaces include the concept 100G ZR frame slices. For example, 400ZR is described in OIF Implementation Agreement 400ZR, OIF-400ZR-01.0, Mar. 10, 2020, the contents of which are incorporated by reference.

In a variable rate application, the user would typically provision a maximum rate to operate the interface. An interface can then be "downshifted" or subrated, to improve margins or support an alternative optical protection path. Some OTUC slices and FlexO/ZR instances are not transported anymore on the subrated interface while other instances (and services mapped to it) are still operating cleanly. For example, an OTUC8 includes eight 100G OTUC slices and may be subrated to 700G, losing one of the slices. Partial failure (P-AIS, P-BDI and P-SSF) or unequipped status can be applied to some of the OTUC slices and FlexO/ZR instances on the interface.

All the same aspects of service management described above apply to subrating use cases as well. Controllers would need to be able to detect and identify interfaces that have changed capacity. Services can be shuffled within a downshifted interface to enable the higher priority services to survive regardless of which portion of the interface has been failed. Interfaces can be managed by integrated Layer 0 and Layer 1 controllers to optimize optical bandwidth (wavelengths) based on services which are still active and those which have failed and need to be moved.

Additionally, it is possible to combine subrating for an individual interface with multiple OTSi grouped interfaces, where all lambdas for the FlexO group interface are downshifted in capacity equally, reducing the overall group capacity.

Figure 15:
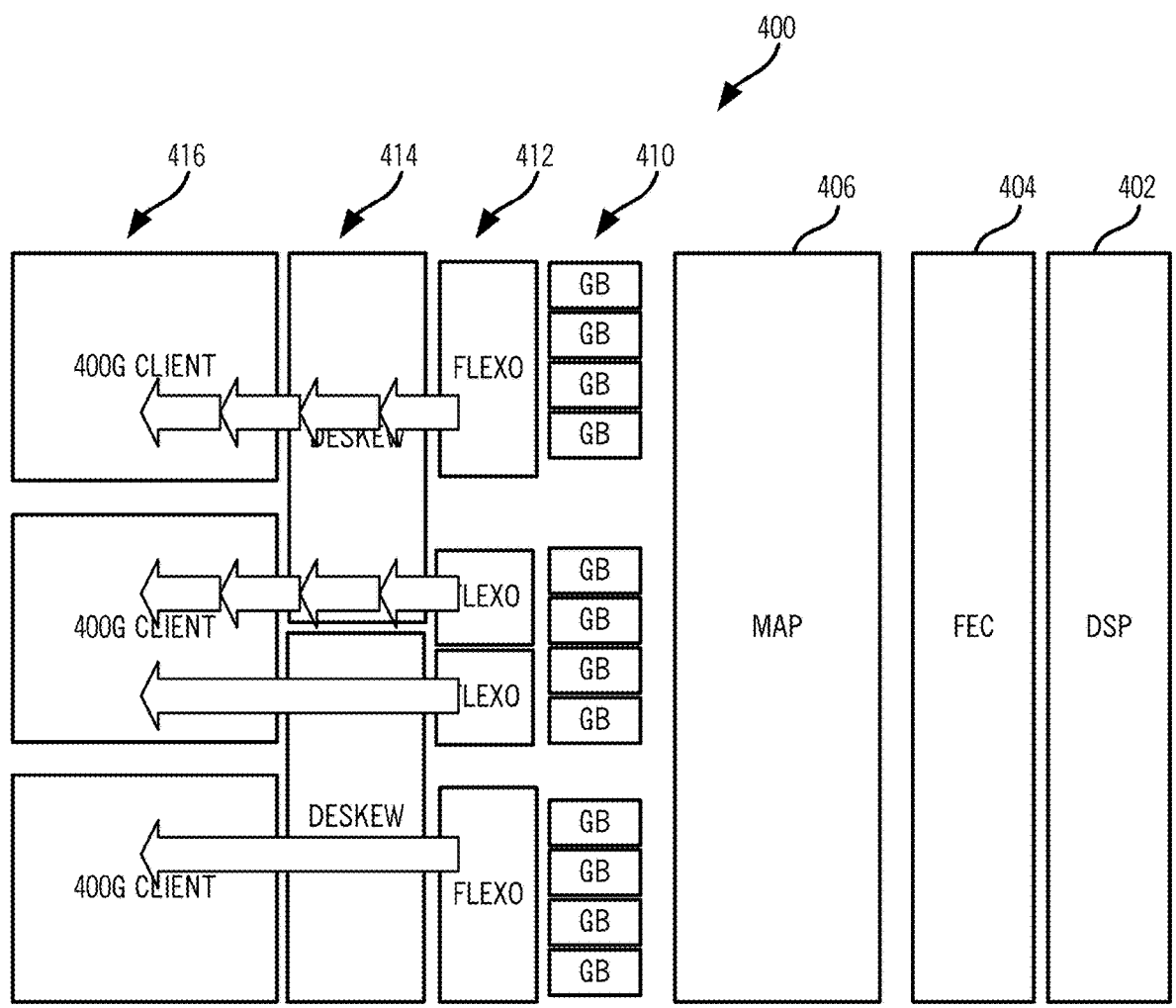
FIG. 15 is a block diagram of circuitry, in a coherent optical modem that can be used in a network element, for supporting FlexO/ZR partial survivability.

FIG. 15 is a block diagram of circuitry 400, in a coherent optical modem that can be used in a network element, for supporting FlexO/ZR partial survivability. The coherent optical modem can be FlexO, and, in other embodiments, a ZR interface. FIG. 15 illustrates the functional components with the right side including a Digital Signal Processor (DSP) 402 that connects to an electro-optic device on the right (not shown). The DSP 402 connects to Forward Error Correction (FEC) circuitry 404 which connects to mapping circuitry 406. The mapping circuitry 406 connects to gearbox circuits 410 that connect to FlexO circuitry 412. The FlexO circuitry 412 connects to deskew circuitry 414 that connects to 400G client interface circuitry 416.

Figure 16:
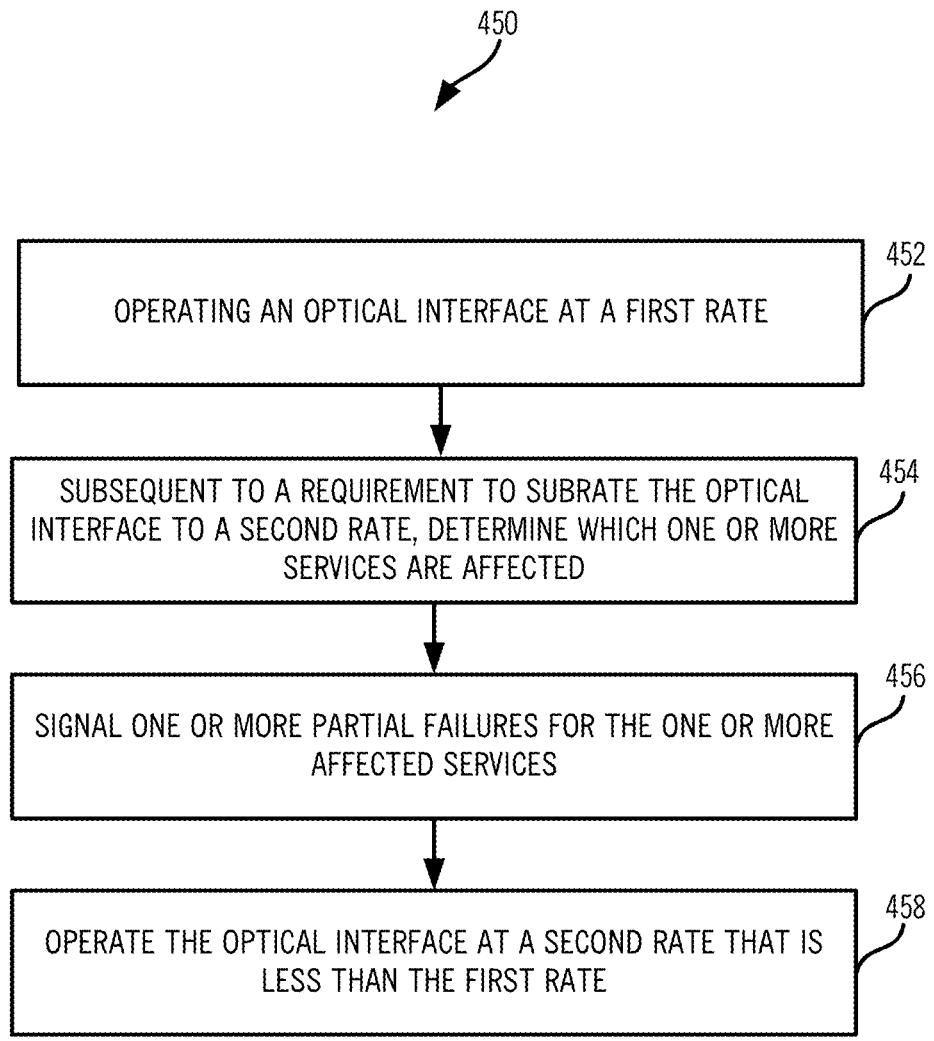
FIG. 16 is a flowchart of a process of FlexO/ZR partial survivability.

The mapping circuitry 406 is configured to map data, and when the capacity of the line interface changes, some FlexO instances will be drop, and P-AIS/BDI/SSF will be associated with those FlexO/ZR instances (and OTUC slices) that are partially failed in such scenario. In FIG. 16, this example shows how an 800G→600G application could be hitless for some services from the protocol's perspective, and some FlexO/ZR instances are failed while other are operating hitlessly (partial survivability).

Such approach could also be applicable to standard FlexO-x-DO (OFEC) or FlexO-x-DSH (CFEC) interfaces, where the rates reduce in capacity from a standard rate (e.g., 400G) to another (e.g., 200G). It is not just for proprietary interfaces and can simplify operation of standards ones as well.

FlexO/ZR Interface Process

FIG. 16 is a flowchart of a process 450 of FlexO/ZR partial survivability. The process 450 can be implemented as a method, via circuitry, via a coherent modem, via a network element, etc. The process 450 includes operating an optical interface at a first rate (step 452); subsequent to a requirement to subrate the optical interface to a second rate, determining which one or more services are affected (step 454); signaling one or more partial failures for the one or more affected services (step 456); and operating the optical interface at a second rate that is less than the first rate.

The optical interface can be a Flexible Optical (FlexO) interface. The FlexO interface can include a plurality of Optical Transport Unit C (OTUC) slices each at about 100 Gb/s, and wherein the one or more partial failures are for one or more OTUC slices.

The optical interface can be a ZR interface. The FlexO interface can include a plurality of ZR slices each at about 100 Gb/s, and wherein the one or more partial failures are for one or more ZR slices.

The one or more partial failures can be signaled through one or more of a partial Alarm Indication Signal (P-AIS), a partial Backward Defect Indication (P-BDI), and a partial Server Signal Fail (P-SSF). The process 450 can further include adjusting overhead of the optical interface based on the one or more partial failures. The process 450 can further include adjusting one or more of the one or more affected services based on priority.

The requirement to subrate can be due to any of optical margin and a requirement to support an alternate path. The optical interface can be part of an Optical Tributary Signal (OTSi).

CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. An optical interface comprising:
   circuitry configured to
   operate the optical interface at a first rate,
   determine a requirement to subrate the optical interface due to one of (1) low optical margin, (2) a requirement to support an alternate path having a lower optical margin, and (3) a failure of an Optical Tributary Signal (OTSi), wherein the optical interface includes a wavelength having a channel thereon and the optical interface is subrated by lowering a rate of the channel on the wavelength, and
   subsequent to the determination to subrate the optical interface to a second rate, (1) determine which one or more services are affected due to the requirement to subrate to the second rate,
   (2) signal one or more partial failures for the one or more affected services for restoration thereof, and
   (3) operate the optical interface at a second rate that is less than the first rate.

2. The optical interface of claim 1, wherein the optical interface is a Flexible Optical Transport Network (FlexO) interface.

3. The optical interface of claim 2, wherein the FlexO interface includes a plurality of Optical Transport Unit C (OTUC) slices, and wherein the one or more partial failures are for one or more respective OTUC slices.

4. The optical interface of claim 1, wherein the optical interface is a ZR interface.

5. The optical interface of claim 1, wherein the optical interface provides an optical signal that includes a plurality of slices, and wherein the one or more partial failures is for one or more slices.

6. The optical interface of claim 1, wherein the one or more partial failures are signaled through one or more of a partial Alarm Indication Signal (P-AIS), a partial Backward Defect Indication (P-BDI), and a partial Server Signal Fail (P-SSF).

7. The optical interface of claim 1, wherein the circuitry is further configured to
   adjust overhead of an optical signal from the optical interface based on the one or more partial failures.

8. The optical interface of claim 1, wherein the circuitry is further configured to
   adjust one or more of the affected services based on priority.

9. The optical interface of claim 1, wherein the optical interface utilizes a single wavelength.

10. The optical interface of claim 1, wherein, while the optical interface is changed to the second rate and while operating at the second rate, services other than the one or more affected services are operated hitlessly.

11. The optical interface of claim 1, wherein the optical interface is an individual interface that is part of multiple OTSi grouped interfaces, where all of the multiple OTSi grouped interfaces are downshifted in capacity equally.

12. The optical interface of claim 1, wherein the first rate and the second rate are each in increments of 100 Gbps.

13. A method comprising:
    operating an optical interface at a first rate;
    determining a requirement to subrate the optical interface due to one of (1) low optical margin, (2) a requirement to support an alternate path having a lower optical margin, and (3) a failure of an Optical Tributary Signal (OTSi), wherein the optical interface includes a wavelength having a channel thereon and the optical interface is subrated by lowering a rate of the channel on the wavelength; and
    subsequent to the determination to subrate the optical interface to a second rate;
    (1) determining which one or more services are affected due to the requirement to subrate to the second rate;
    (2) signaling one or more partial failures for the one or more affected services for restoration thereof; and
    (3) operating the optical interface at a second rate that is less than the first rate.

14. The method of claim 13, wherein the optical interface is a Flexible Optical Transport Network (FlexO) interface.

15. The method of claim 14, wherein the FlexO interface includes a plurality of Optical Transport Unit C (OTUC) slices, and wherein the one or more partial failure are for one or more OTUC slices.

16. The method of claim 13, wherein the optical interface is a ZR interface.

17. The method of claim 13, wherein the optical interface provides an optical signal that includes a plurality of slices, and wherein the one or more partial failure is for one or more slices.

18. The method of claim 13, wherein the one or more partial failures are signaled through one or more of a partial Alarm Indication Signal (P-AIS), a partial Backward Defect Indication (P-BDI), and a partial Server Signal Fail (P-SSF).

19. The method of claim 13, further comprising adjusting overhead of an optical signal from the optical interface based on the one or more partial failure.

20. The method of claim 13, further comprising
    adjusting one or more of the affected services based on priority.

* * * * *